US009026045B2

(12) United States Patent
Sakata et al.

(10) Patent No.: US 9,026,045 B2
(45) Date of Patent: May 5, 2015

(54) SHORT RANGE WIRELESS COMMUNICATION APPARATUS

(75) Inventors: Ryuuji Sakata, Kariya (JP); Soichi Saito, Nagoya (JP); Suguru Matsushita, Obu (JP); Takahisa Ozaki, Gamagori (JP); Masao Sasaki, Okazaki (JP); Kazushige Hayashi, Toyota (JP); Shinichi Yamamoto, Toyota (JP)

(73) Assignee: Denso Corporation, Kariya (JP)

( * ) Notice: Subject to any disclaimer, the term of this patent is extended or adjusted under 35 U.S.C. 154(b) by 575 days.

(21) Appl. No.: 13/488,934

(22) Filed: Jun. 5, 2012

(65) Prior Publication Data

US 2012/0309315 A1  Dec. 6, 2012

(30) Foreign Application Priority Data

Jun. 6, 2011  (JP) ................... 2011-126255

(51) Int. Cl.
*H04B 7/00* (2006.01)
*H04M 1/60* (2006.01)

(52) U.S. Cl.
CPC .................. *H04M 1/6091* (2013.01)

(58) Field of Classification Search
CPC ........................ H04W 4/008; H04M 1/6091
USPC ....................................... 455/41.2
See application file for complete search history.

(56) References Cited

U.S. PATENT DOCUMENTS

| 2005/0143046 | A1 | 6/2005 | Suzuki |
| 2007/0081506 | A1 | 4/2007 | Yamada |
| 2008/0269961 | A1 | 10/2008 | Shitanaka et al. |
| 2009/0253466 | A1 | 10/2009 | Saito et al. |
| 2010/0159948 | A1* | 6/2010 | Spivey et al. ............ 455/456.1 |
| 2011/0014946 | A1* | 1/2011 | Kawagishi ................ 455/556.1 |
| 2011/0237188 | A1* | 9/2011 | Sen ............................. 455/41.2 |
| 2013/0005260 | A1* | 1/2013 | Hosono et al. ............. 455/41.2 |

FOREIGN PATENT DOCUMENTS

| CN | 1630217 | 6/2005 |
| JP | 08-140075 | 5/1996 |
| JP | 2000-231402 | 8/2000 |
| JP | 2004-328153 | 11/2004 |
| JP | 2005-184505 | 7/2005 |
| JP | 2010-109681 | 5/2010 |

OTHER PUBLICATIONS

Office Action dated Jan. 27, 2015 in corresponding Chinese Application No. 201210182760.X.
Office Action dated Jun. 17, 2014 in corresponding Chinese Application No. 201210182760.
Office Action dated Dec. 2, 2014 in corresponding Japanese Application No. 2011-126255.

* cited by examiner

*Primary Examiner* — Lewis West
(74) *Attorney, Agent, or Firm* — Harness, Dickey & Pierce, PLC

(57) ABSTRACT

An in-vehicle apparatus selects, as a profile connection mode, one connection mode out of a first connection mode and a second connection mode, and performs profile connection using the selected one connection mode. The first connection mode is to transmit a profile connection request signal to a communication partner so as to start a connection procedure; the second connection mode is to wait for reception of a profile connection request signal from the communication partner for a predetermined time so as to start the connection procedure. When the profile connection using the selected one connection mode fails, a connection procedure using the other connection mode that was not selected previously is started. When the profile connection using the other connection mode is successful, upon occurrence of a next profile connection request, the other connection mode is selected as a profile connection mode.

15 Claims, 15 Drawing Sheets

SHORT RANGE WIRELESS COMMUNICATION APPARATUS

CROSS REFERENCE TO RELATED APPLICATION

This application is based on Japanese Patent Application No. 2011-126255 filed on Jun. 6, 2011, the disclosure of which is incorporated herein by reference.

TECHNICAL FIELD

The present disclosure relates to a short range wireless communication apparatus that alternatively selects one of first and second connection modes to start a connection procedure as a predetermined communication protocol connection mode; the first connection mode is to transmit a predetermined communication protocol connection request signal to a communication partner apparatus so as to start a communication procedure whereas the second connection mode is to wait for reception of a predetermined communication protocol connection request signal from a communication partner apparatus for a predetermined time.

BACKGROUND

[Patent document 1] JP 2008-273370 A (US 2008/0269961)
[Patent document 2] JP 2009-253601 A (US 2009/0253466)
[Patent document 3] JP 2009-253603 A (US 2009/0253466)

A short range wireless communication module, integrated in a short range wireless communication apparatus having a short range wireless communication function, is capable of connecting plural predetermined communication protocols between the communication module and a short range wireless communication module of a communication partner apparatus (e.g., see Patent documents 1 to 3).

There are known a first connection mode and a second connection mode for connecting a predetermined communication protocol between the short range wireless communication module and the short range wireless communication module of the communication partner apparatus. The first connection mode is to transmit a predetermined communication protocol connection request signal to the short range wireless communication module of the communication partner apparatus so as to start a connection procedure; the second connection mode is to wait for reception of a predetermined communication protocol connection request signal from the short range wireless communication module of the communication partner apparatus so as to start the connection procedure. When both of the apparatuses employ the first connection mode, each of the apparatuses transmits a predetermined communication protocol connection request signal. Further, when both of the apparatuses employ the second connection mode, each of the apparatuses waits for reception of a predetermined communication protocol connection request signal for a predetermined time. Thus it is impossible to connect the predetermined communication protocol.

From such situation, it is necessary to set a connection mode of connecting the predetermined communication protocol to be adopted in the short range wireless communication module in response to the connection mode adopted in the short range wireless communication module of the communication partner apparatus. Generally, the connection mode adopted in the short range wireless communication module is set by a manufacturer of the short range wireless communication module, and in some cases, a method for changing the setting of the connection mode is not disclosed to the users.

Further, even when the method for changing the setting of the connection mode is disclosed to the users, it is necessary for the user to recognize the connection mode adopted in the short range wireless communication module of the communication partner apparatus so as to change the connection mode adopted in the short range wireless communication module. The work operation to recognize the connection mode adopted in the short range wireless communication module of the communication partner apparatus cannot be performed without difficulty.

SUMMARY

It is an object of the present disclosure to provide a short range wireless communication apparatus capable of appropriately connecting a predetermined communication protocol between its connection device and a communication-partner side connection device regardless of a connection mode adopted in the communication-partner side connection device.

To achieve the above object, according to a first example of a short range wireless communication apparatus is provided to include a connection device and a controller. The connection device is to connect a predetermined communication protocol between the connection device and a communication-partner side connection device in short range wireless communication. The controller is to alternatively select a first connection mode or a second connection mode to connect the predetermined communication protocol, to start a connection procedure. The first connection mode is to transmit a predetermined communication protocol connection request signal from the connection device to the communication-partner side connection device. The second connection mode is to wait for reception of a predetermined communication protocol connection request signal from the communication-partner side connection device to the connection device for a predetermined time. Herein, the controller selects one of the first connection mode and the second connection mode when connecting the predetermined communication protocol between the connection device and the communication-partner side connection device and then determines whether the connection of the predetermined communication protocol using the one of the first connection mode and the second connection mode results in failure or success. When it is determined that the connection of the predetermined communication protocol using the one of the first connection mode and the second connection mode results in failure, the controller starts the connection procedure using an other of the first connection mode and the second connection mode that is different from the one of the first connection mode and the second connection mode and then determines whether the connection of the predetermined communication protocol using the other of the first connection mode and the second connection mode results in failure or success. When it is determined that the connection of the predetermined communication protocol using the other of the first connection mode and the second connection mode results in success, the controller selects the other of the first connection mode and the second connection mode upon next connection of the predetermined communication protocol between the connection device and the communication-partner side connection device.

With this configuration, a connection procedure is started using one connection mode. When connection of a predetermined communication protocol using the one connection mode fails, the connection procedure is started by another connection mode different from the former connection mode. When the connection of the predetermined communication protocol using the other connection mode is successful, the next connection of the predetermined communication protocol is started by selecting the other connection mode that was successful. Accordingly, regardless of the connection mode adopted in the communication-partner side connection device, it is possible to appropriately connect the predetermined communication protocol between the connection device and the communication-partner side connection device. Further, upon next connection of the predetermined communication protocol, the connection procedure is started using the other connection mode, which was used in the successful connection, from the beginning without using the former connection mode, which was used in the failed connection. Thus, the connection of the predetermined communication protocol can be quickly completed.

According to a second example of a short range wireless communication apparatus is provided to include a connection device, a controller, and a nonvolatile storage device. The connection device is to connect a predetermined communication protocol between the connection device and a communication-partner side connection device in short range wireless communication. The controller is to alternatively select a first connection mode or a second connection mode to connect the predetermined communication protocol, to start a connection procedure. The first connection mode is to transmit a predetermined communication protocol connection request signal from the connection device to the communication-partner side connection device. The second connection mode is to wait for reception of the predetermined communication protocol connection request signal from the communication-partner side connection device to the connection device for a predetermined time. The nonvolatile storage device is to store as a first stored connection mode one of the first connection mode and the second connection mode to connect the predetermined communication protocol. Herein, the controller selects the one of the first connection mode and the second connection mode that is stored as the first stored connection mode in the storage device when connecting the predetermined communication protocol between the connection device and the communication-partner side connection device and then determines whether the connection of the predetermined communication protocol using the one of the first connection mode and the second connection mode results in failure or success. When it is determined that the connection of the predetermined communication protocol using the one of the first connection mode and the second connection mode results in failure, the controller starts the connection procedure using an other of the first connection mode and the second connection mode that is different from the one of the first connection mode and the second connection mode and then determines whether the connection of the predetermined communication protocol using the other of the first connection mode and the second connection mode results in failure or success. When it is determined that the connection of the predetermined communication protocol using the other of the first connection mode and the second connection mode results in success, the controller stores as a second stored connection mode the other of the first connection mode and the second connection mode in the storage device, so as to select the other of the first connection mode and the second connection mode that is stored as the second stored connection mode in the storage device upon next connection of the predetermined communication protocol between the connection device and the communication-partner side connection device.

This configuration of the second example can provide an advantage similar to that of the first example.

BRIEF DESCRIPTION OF THE DRAWINGS

The above and other objects, features, and advantages of the present disclosure will become more apparent from the following detailed description made with reference to the accompanying drawings. In the drawings.

DETAILED DESCRIPTION

Figure 1:
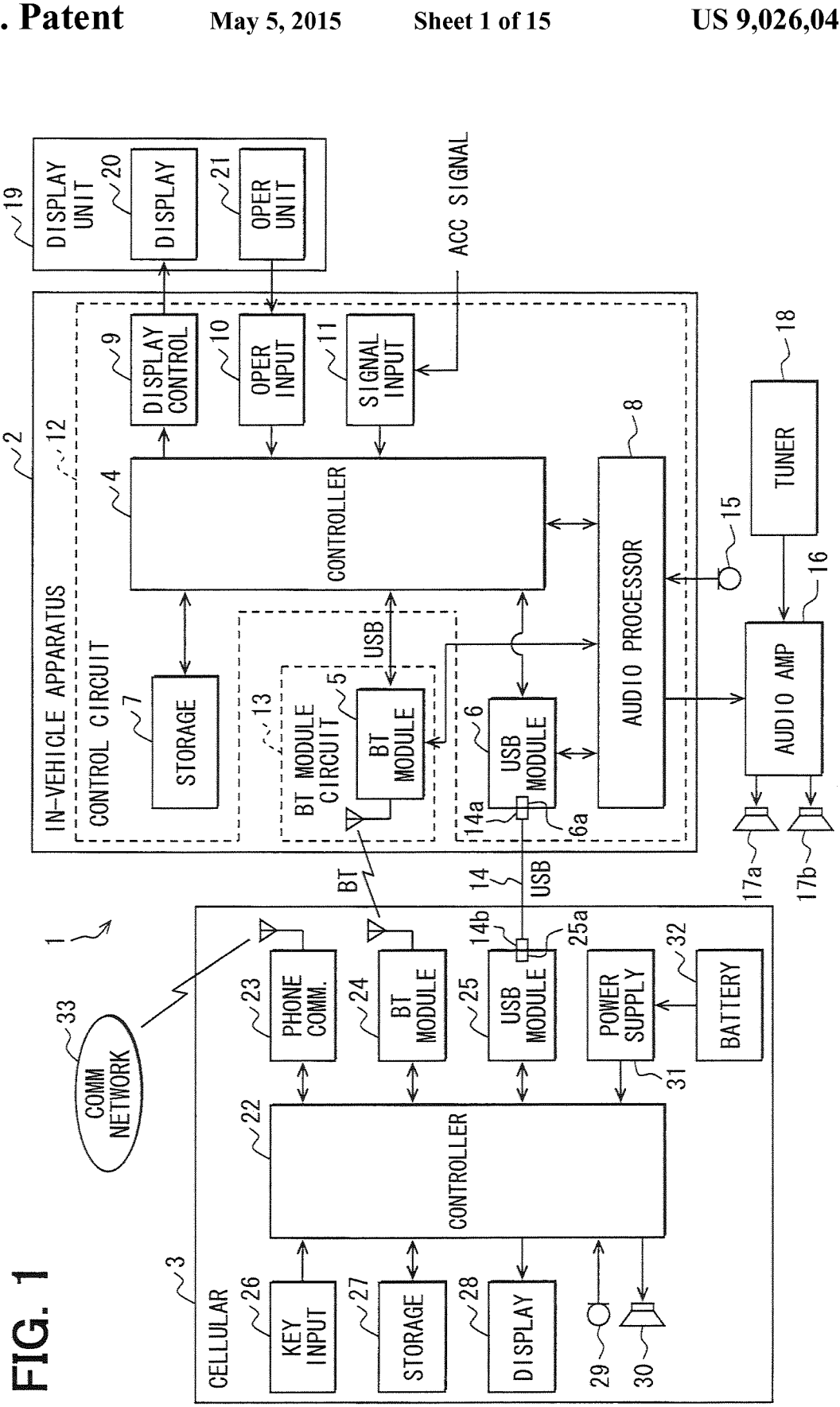
FIG. 1 is a functional block diagram showing an embodiment of the present disclosure.

Hereinbelow, an embodiment in which the present disclosure is applied to a Bluetooth in-vehicle apparatus (hereinbelow, simply referred to as an "in-vehicle apparatus") having a BT communication function will be described with reference to the drawings. The Bluetooth is a registered trademark; hereinbelow, it is referred to as a "BT." Note that in the embodiment, a BT cellular phone having the BT communication function (hereinbelow simply referred to as a "cellular phone") is brought into a compartment of a vehicle in which the in-vehicle apparatus is mounted, and the in-vehicle apparatus and the cellular phone are in a BT-communicable status.

A BT communication system 1 has an in-vehicle apparatus 2 integrated or mounted in a vehicle and a cellular phone 3 brought in the vehicle compartment. The in-vehicle apparatus 2 is also referred to as a short range wireless communication apparatus. The in-vehicle apparatus 2 has a controller 4 (also referred to as a control device or means), a BT module 5 (also referred to as a connection device or means), a USB (Universal Serial Bus) module 6, a storage unit 7 (also referred to as a storage device or means), an audio processor 8, a display controller 9, an operation input unit 10, a signal input unit 11, and the like. The controller 4, the USB module 6, the storage unit 7, the audio processor 8, the display controller 9, the operation input unit 10, and the signal input unit 11 are physically packaged on a control circuit board 12. The BT module 5 is physically packaged on a BT module circuit board 13 which is a different member from the control circuit board 12. The controller 4 and the BT module 5 are USB-connected.

The controller 4 includes a CPU which is a known microcomputer, a RAM, a ROM, and an I/O bus to control the entire operation of the in-vehicle apparatus 2 including a communication operation, and a data management operation. The BT module 5 has a function of connecting a BT communication line (i.e., a short range wireless communication line) between the BT module 5 and the BT module of the cellular phone 3 to be described later, and performing BT communication through the BT communication line. The BT module 5 is capable of simultaneous connection (so-called multiple connection) of plural profiles defined in the BT communication standards such as the HFP (Hands Free Profile) defining hands free communication, the MAP (Message Access Profile) defining electronic mail data transfer, the SPP (Serial Port Profile) defining virtual serial-port data communication, the DUN (Dial-up Networking Profile) defining dial-up connection to the Internet, the PBAP (Phone Book Access Profile) defining phonebook data transfer, the OPP (Object Push Profile) also defining phonebook data transfer, the A2DP (Advanced Audio Distribution Profile) defining audio data transfer, and the AVRCP (Audio/Video Remote Control Profile) defining transfer of control data related to audio data control. The profiles including the above HFP, MAP, SPP, DUN, PBAP, OPP, A2DP, AVRCP profiles correspond to communication protocols defined by respective functions.

The USB module 6 has a connection terminal 6a connectable/disconnectable to/from a connection terminal 14a of a USB connection cable 14. The USB module 6 has a function of, in a status where one connection terminal 14a of the USB connection cable 14 is connected to the connection terminal 6a and another connection terminal 14b of the USB connection cable 14 is connected to a communication terminal of a USB module of the cellular phone 3 to be described later, connecting a USB communication line between the USB module 6 and the USB module of the cellular phone 3 so as to perform USB communication through the USB communication line.

The storage unit 7 has a nonvolatile storage area for storing various data. In this case, when the BT module 5 connects the MAP between the BT module 5 and the BT module of the cellular phone 3, electronic mail data transferred from the cellular phone 3 to the BT module 5 is stored into the storage unit 7. Such electronic mail data includes sender information to specify electronic mail destination, reception date and time information to specify date and time of reception of the electronic mail with the cellular phone 3, type information to specify the type of the electronic mail, and subject information to specify subject of the electronic mail inputted by the sender. Further, when the BT module 5 connects the PBAP between the BT module 5 and the BT module of the cellular phone 3, various data are stored in the storage unit 7. Those various data include (i) phonebook data transferred from the cellular phone 3 to the BT module 5, (ii) call origination history data indicating correspondence between origination time and origination telephone number regarding a call origination operation from the in-vehicle apparatus 2 or a call origination operation from the cellular phone 3 connecting the HFP between the cellular phone 3 and the in-vehicle apparatus 2, and (iii) incoming history data indicating correspondence between incoming time and incoming telephone number regarding an incoming operation of the cellular phone 3 connecting the HFP between the cellular phone 3 and the in-vehicle apparatus 2.

Further, the storage unit 7 holds settings of connection modes for the respective profiles, in association with the respective plural BT modules (including the BT module of the cellular phone 3) connectable to the BT communication line by the BT module 5. The connection mode is, though described in detail later, is any one of "connection from communication originator apparatus" and "connection from communication partner apparatus." The "connection from communication originator apparatus" is a connection mode of transmitting a profile connection request signal (i.e., a predetermined communication protocol connection request signal) from the communication originator apparatus to the communication partner apparatus so as to start a connection procedure. The "connection from communication partner apparatus" is a connection mode of waiting for reception of a profile connection request signal from a communication partner apparatus to the communication originator apparatus for a predetermined time and start the connection procedure. Note that it is possible to change (update) the settings of the connection modes stored in the storage unit 7.

The audio processor 8 is connected to (i) a microphone 15 provided in a position to easily collect voice from a user e.g. in the vicinity of a steering wheel in the vehicle compartment, and (ii) an audio amplifier 16 provided outside the in-vehicle apparatus 2. The audio amplifier 16 is connected to speakers 17a and 17b.

In a status where the BT module 5 and the BT module of the cellular phone 3 to be described later connect the HFP protocol therebetween, when the voice from the user is inputted from the microphone 15 as transmission audio data, the audio processor 8 performs audio process on the inputted transmission audio data and outputs the processed data to the BT module 5. When reception audio data is inputted from the BT module 5, the audio processor 8 outputs the reception audio data to the audio amplifier 16.

Further, in a status where the BT module 5 and the BT module of the cellular phone 3 to be described later connect the A2DP and AVRCP protocols therebetween, the audio processor 8 outputs audio data, transferred from the BT module of the cellular phone 3 by the A2DP and AVRCP protocols to the BT module 5, to the audio amplifier 16. Further, in a status where the USB module 6 and the USB module of the cellular phone 3 to be described later are capable of performing USB communication therebetween, the audio processor 8 outputs audio data, transferred from the USB module of the cellular phone 3 through the USB communication line to the USB module 6, to the audio amplifier 16.

When receiving reception audio data and audio data from the audio processor 8, the audio amplifier 16 amplifies the received reception audio data and the audio data, and outputs the data from the speakers 17a and 17b. Further, the audio amplifier 16 is also connected to a tuner deck 18. When the audio amplifier 16 receives music data, reproduced with the tuner deck 18 from e.g. a music recording medium, from the tuner deck 18, the audio amplifier 16 also amplifies the received music data and outputs it from the speakers 17a and 17b.

A display unit 19 has a display 20 to display various display windows and an operation unit 21 to form a touch switch on a display screen. When the display controller 9 receives a display command signal from the controller 4, the display controller 9 controls a display operation of the display 20 in the display unit 19 based on the received display command signal. When the operation input unit 10 receives an operation detection signal from the operation unit 21 in accordance with the user's operation of the touch switch formed in the display screen, the operation input unit 10 outputs the received operation detection signal to the controller 4. The controller 4 analyzes the operation detection signal received from the operation input unit 10 and specifies the user's operation.

The signal input unit 11 is connected to an ACC (accessory) switch integrated in the vehicle. When the signal input unit 11 receives an ACC signal outputted from the ACC switch, the signal input unit 11 outputs the received ACC signal to the controller 4. The controller 4 turns an apparatus power source on/off based on on/off of the ACC signal received from the signal input unit 11. That is, the controller 4 turns the apparatus power source on (starts the in-vehicle apparatus 2) at the timing of transition of the ACC signal from off to on, and turns the apparatus power source off (stops the in-vehicle apparatus 2) at the timing of transition of the ACC signal from on to off.

The cellular phone 3 has a controller 22, a telephone communication unit 23, a BT module 24 (also referred to as a communication-partner side connection device or means), a USB module 25, a key input unit 26, a storage unit 27, a display unit 28, a microphone 29, a speaker 30, a power supply unit 31 and the like.

The controller 22 includes a CPU which is a known microcomputer, a RAM, a ROM, an I/O bus and the like, to control the entire operation of the cellular phone 3 including a communication operation, a data management operation and the like. The telephone communication unit 23 performs telephone communication with a communication network 33. Note that the communication network 33 includes facilities to provide known cellular phone communication services such as a cellular phone base station and a base station controller. The BT module 24 has a function of connecting the BT communication line between the BT module 24 and the BT module 5 of the above-described in-vehicle apparatus 2 so as to perform BT communication through the BT communication line. The BT module 24 is capable of simultaneous connection of plural profiles defined in the BT communication standards such as the HFP, MAP, SPP, DUN, PBAP, OPP, A2DP, and AVRCP profiles.

The USB module 25 has a connection terminal 25a connectable/removable to/from the connection terminal 14b of the USB connection cable 14. The USB module 25 has a function of, in a status where the one connection terminal 14a of the USB connection cable 14 is connected to the connection terminal 6a of the USB module 6 of the in-vehicle apparatus 2 and another connection terminal 14b of the USB connection cable 14 is connected to the connection terminal 25a, connecting the USB communication line between the USB module 25 and the USB module 6 of the in-vehicle apparatus 2 so as to perform USB communication through the USB communication line.

The key input unit 26, having various keys which the user can operate, outputs the operation detection signal to the controller 22 in accordance with the user's key operation. The controller 22 analyzes the operation detection signal received from the key input unit 26 to specify the user operation. The storage unit 27 has a nonvolatile storage area for storing various data. Further, the storage unit 27 holds settings of connection modes for the respective profiles in association with the respective BT modules (including the BT module 5 of the in-vehicle apparatus 2) connectable to the BT communication line by the BT module 24. Note that it is also possible to change (update) the settings of the connection modes stored in the storage unit 27.

When the display unit 28 receives the display command signal from the controller 22, the display unit 28 displays various display windows based on the received display command signals. Further, when the controller 22 receives voice from the user from the microphone 29 as transmission audio data, the controller 22 performs audio process on the received transmission audio data. When the controller 22 receives reception audio data from the telephone communication unit 23, the controller 22 outputs the received reception audio data from the speaker 30 as sound. The power supply unit 31 supplies electric power discharged from a battery 32 attachable/removable to/from the main body to the respective functional blocks as operation electric power.

In the above-described structure, the profiles connected between the BT module 5 of the in-vehicle apparatus 2 and the BT module 24 of the cellular phone 3 include (i) a (former) profile connected upon transmission of the profile connection request signal from the BT module 5 to the BT module 24 and (ii) a (latter) profile connected upon transmission of the connection request signal from the BT module 24 to the BT module 5.

That is, when the former profile is connected between the BT module 5 and the BT module 24, a first connection mode is used. The first connection mode takes place on the condition that the setting for the connection mode is provided such that the BT module 5 transmits a profile connection request signal whereas the BT module 24 waits for the reception of the profile connection request signal from the BT module 5 for a predetermined time. The controller 4 of the in-vehicle apparatus 2 thereby transmits the profile connection request signal from the BT module 5 to the BT module 24 so as to start a connection procedure (to perform the first connection mode). When the BT module 5 and the BT module 24 have normally terminated the connection procedure therebetween, the controller 4 normally completes the connection of the former profile (profile connection is possible).

On the other hand, when the latter profile is connected between the BT module 5 and the BT module 24, a second connection mode is used. The second connection mode takes place on the condition that the setting for the connection mode is provided such that the BT module 24 transmits a profile connection request signal whereas the BT module 5 waits for the reception of the profile connection request signal from the BT module 24 for a predetermined time. The controller 4 of the in-vehicle apparatus 2 thereby controls the BT module 5 to wait for the reception of the profile connection request signal from the BT module 24 for the predetermined time, and starts a connection procedure (to perform the second connection mode). When the BT module 5 and the BT module 24 have normally terminated the connection procedure therebetween, the controller 4 normally completes the connection of the latter profile.

In other words, when the setting for the connection mode is provided such that both of the BT module 5 and the BT module 24 transmit the profile connection request signal, or such that both of the BT module 5 and the BT module 24 wait for the reception of the profile connection request signal for the predetermined time, the controller 4 does not normally complete the profile connection (profile connection is impossible).

Figure 2:
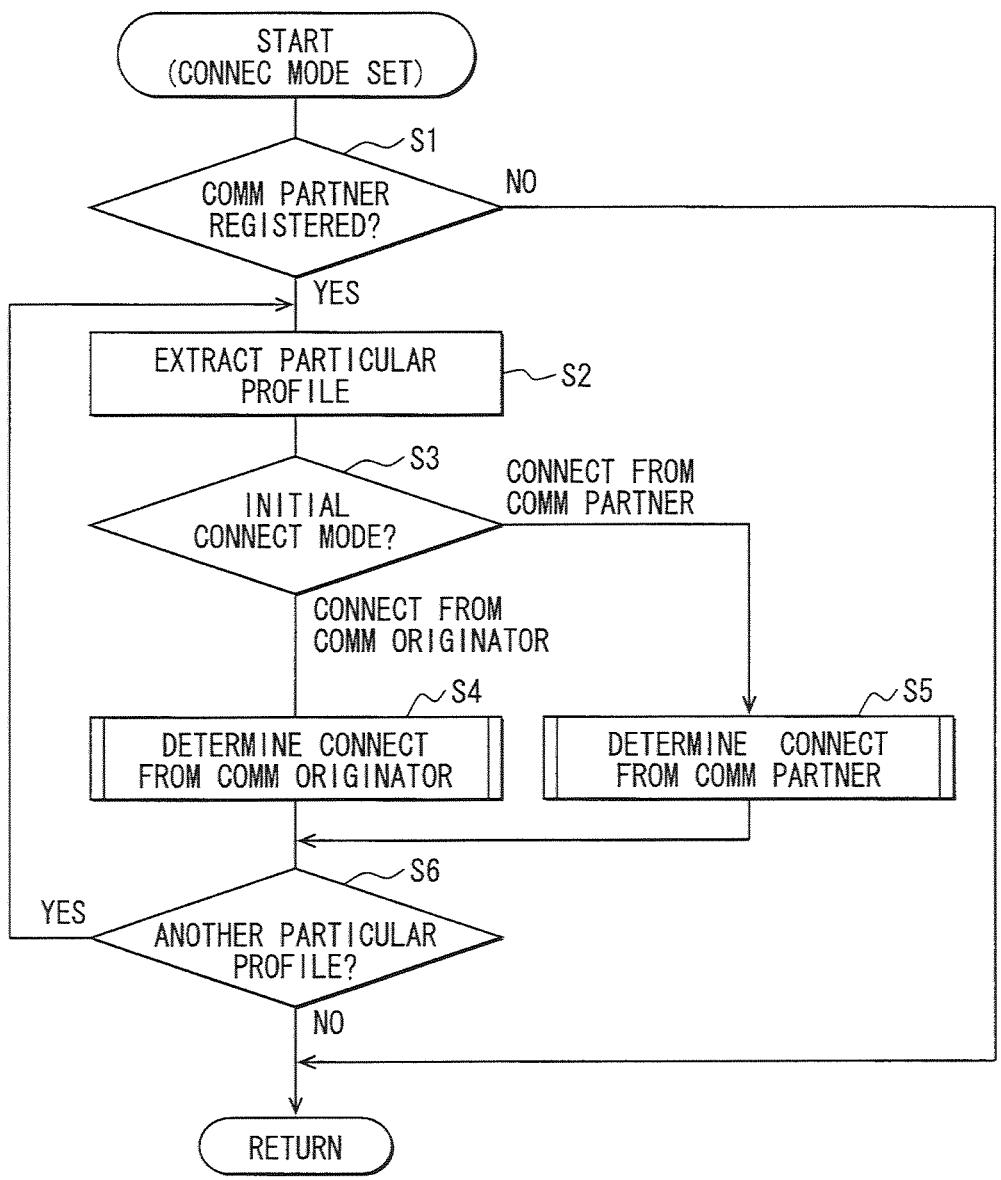
FIGS. 2, 3, and 4 are flowchart diagrams illustrating processes performed by an in-vehicle apparatus.
Figure 3:
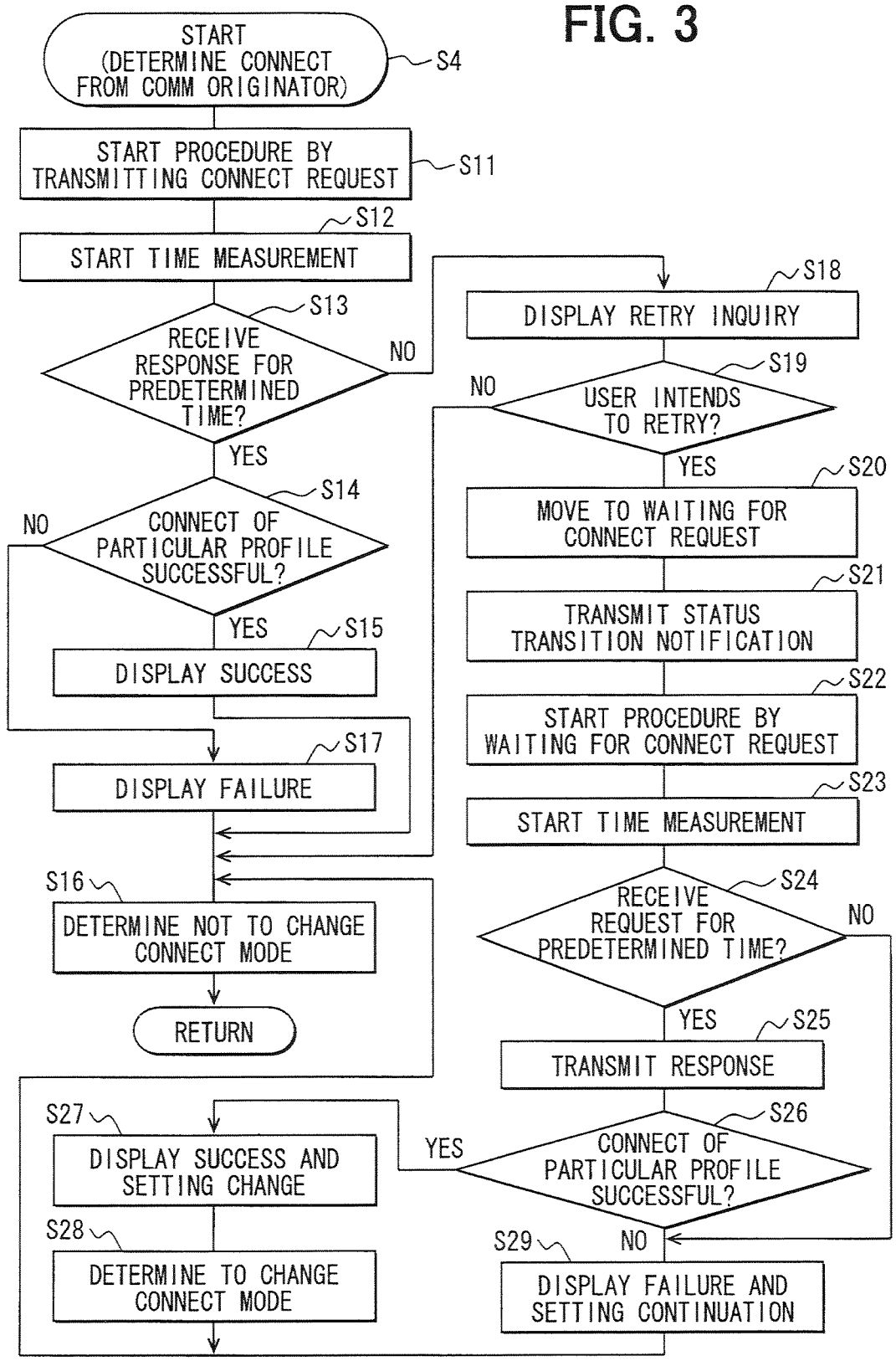
Figure 4:
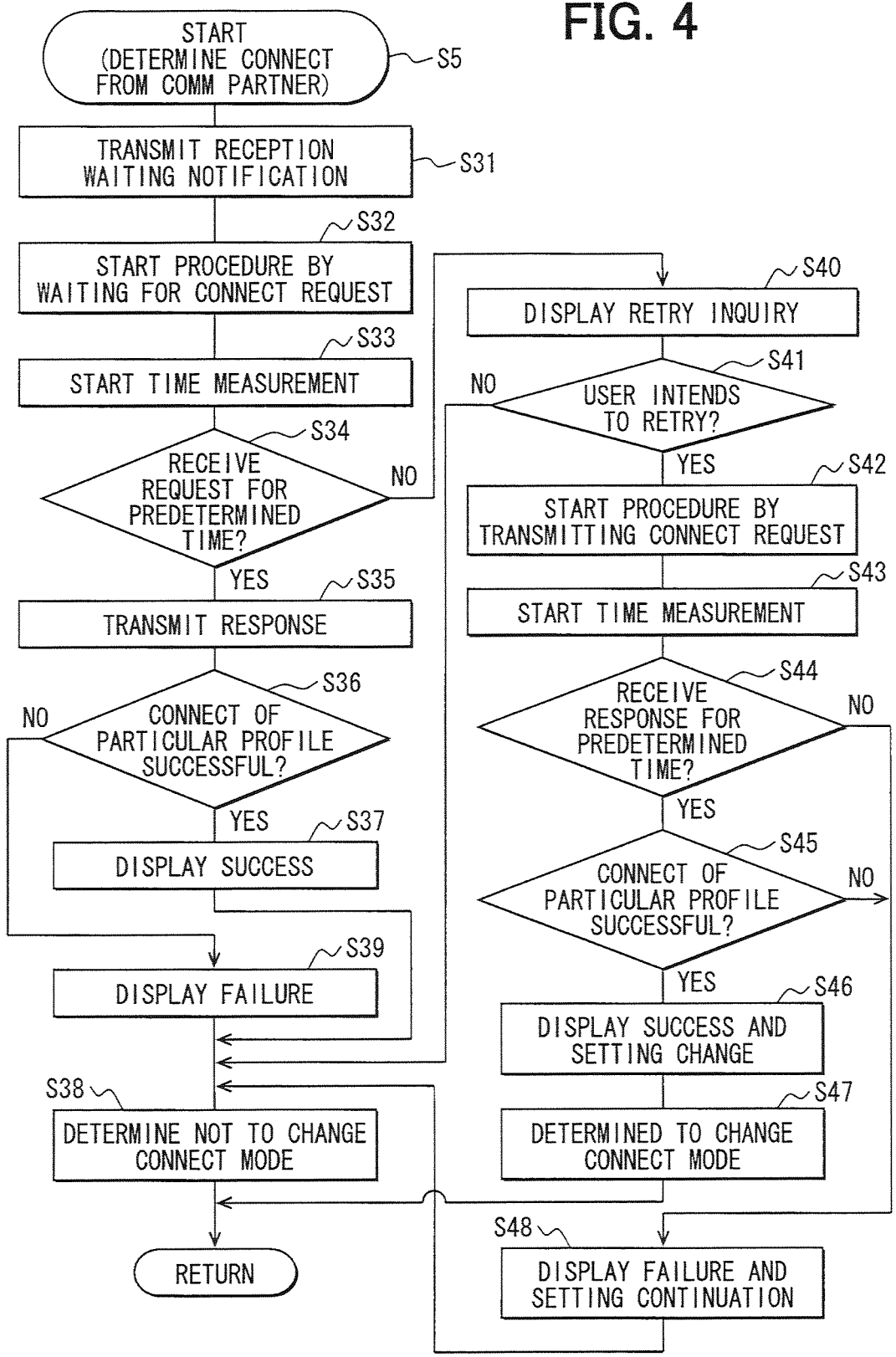

Next, the operation of the above-described structure will be described with reference to FIGS. 2 to 17. FIGS. 2 to 4 are flowcharts showing processes performed by the controller 4 of the in-vehicle apparatus 2.

In the in-vehicle apparatus 2, when it is determined that the apparatus power source in-vehicle apparatus 2 has been turned on, the controller 4 starts main process. The controller 4 periodically performs profile connection mode setting process at a predetermined interval as sub process in the main process until it is determined that the apparatus power source is turned off. Note that the controller 4 performs process of determination of connection from communication originator apparatus and process of determination of connection from communication partner apparatus as sub processes in the profile connection mode setting process as described later. Hereinbelow, these processes will be sequentially described.

It is noted that a flowchart or the processing of the flowchart in the present application includes sections (also referred to as steps), each of which is represented, for instance, as S1. Further, each section can be divided into several sub-sections while several sections can be combined into a single section. Furthermore, each of thus configured sections can be also referred to as a device, module, or means.

(1) Profile Connection Mode Setting Process (See FIG. 2)

The controller 4 moves from the main process to the profile connection mode setting process. The controller 4 starts the profile connection mode setting process, and determines whether or not a registration operation to register the cellular phone 3 as a communication partner apparatus in BT communication has been performed (S1). The registration operation is an operation by the user to operate e.g. the various switches formed in a registration window (not shown) displayed on the display 20 to register the cellular phone 3 as a communication partner apparatus in the BT communication. The cellular phone 3, registered by the registration operation as a communication partner apparatus for the in-vehicle apparatus 2 in the BT communication, does not require any additional registration operation unless the registration is released.

When it is determined by receiving the operation detection signal from the operation input unit 10 that the user has performed the registration operation with the operation unit 21 to register the cellular phone 3 as a communication partner apparatus in the BT communication (YES at S1), the controller 4 extracts a particular profile (also referred to as a predetermined communication protocol) as a connection mode setting target (S2). The controller 4 determines whether the initial setting of the connection mode for the particular profile extracted as the connection mode setting target is "connection from communication originator apparatus" or "connection from communication partner apparatus" (S3). In this case, it may be arranged such that the controller 4 extracts the particular profile as a connection mode setting target in accordance with an extraction order previously set by a manufacturer of the BT module 5; otherwise, it may be arranged such that the controller 4 extracts the particular profile as a connection mode setting target by performing a particular profile selection operation with the operation unit 21.

When it is determined that the initial setting of the connection mode for the particular profile stored in the storage unit 7 is the "connection from communication originator apparatus," the controller 4 moves to the process of determination of the connection from communication originator apparatus (S4). On the other hand, when it is determined that the initial setting of the connection mode for the particular profile stored in the storage unit 7 is the "connection from communication partner apparatus," the controller 4 moves to the process of determination of the connection from communication partner apparatus (S5). Further, when it is determined that a particular profile to be extracted as a connection mode setting target exists (YES at S6), the controller 4 returns to the above-described S2, and repeatedly performs the process at S2 and the subsequent processes. When it is determined that no particular profile to be extracted as a connection mode setting target remains (NO at S6), the controller 4 terminates the profile connection mode setting process and returns to the main process.

(2) Determination of Connection from Communication Originator Apparatus (see FIG. 3)

The controller 4 moves from the profile connection mode setting process to the process of determination of connection from communication originator apparatus. Then the controller 4 starts the process of determination of connection from communication originator apparatus, then transmits the profile connection request signal from the BT module 5 to the BT module 24 to start the connection procedure (S11), starts time measurement of the predetermined time with a timer function (S12), and waits for the reception of the profile connection response signal from the BT module 24 to the BT module 5 for a predetermined time (S13). The predetermined time in this case is longer than time required by the BT module 24 to normally perform the series of process, after the reception of the profile connection request signal from the BT module 5, to transmit the profile connection response signal to the BT module 5. Further, the predetermined time is shorter than time required by the BT module 24 to determine that the profile connection request signal has been received from the BT module 5 but it is impossible to transmit the profile connection response signal to the BT module 5 due to some factor. The predetermined time may be previously set using e.g. the result of connection test between the in-vehicle apparatus 2 and the cellular phone 3.

Note that in cases that (i) the initial setting of the connection mode for the particular profile is for the "connection from communication partner apparatus" that is different from the initial setting of the connection mode for the particular profile in the in-vehicle apparatus 2 and (ii) it is possible for the BT module 24 to normally perform the connection procedure for the particular profile, the BT module 24 receives the profile connection request signal from the BT module 5, and then transmits the profile connection response signal to the BT module 5 within the predetermined time. On the other hand, in cases that the initial setting of the connection mode for the particular profile in the BT module 24 is for the "connection from communication originator apparatus" that is the same as the initial setting of the connection mode for the particular profile in the in-vehicle apparatus 2, the BT module 24 does not transmit the profile connection response signal to the BT module 5 within the predetermined time even when the BT module 24 receives the profile connection request signal from the BT module 5. Further, in cases that (i) the initial setting of the connection mode for the particular profile in the BT module 24 is for the "connection from communication partner apparatus" that is different from the initial setting of the connection mode for the particular profile in the in-vehicle apparatus 2, but (ii) it is impossible for the BT module 24 to normally perform the connection procedure for the particular profile, the BT module 24 does not transmit the profile connection response signal to the BT module 5 within the predetermined time even when the BT module 24 receives the profile connection request signal from the BT module 5.

After the transmission of the profile connection request signal from the BT module 5 to the BT module 24 and the start of the time measurement of the predetermined time with the timer function, the controller 4 determines whether or not the profile connection response signal from the BT module 24 has been received with the BT module 5 within the predetermined time (S13). When it is determined that the profile connection response signal from the BT module 24 has been received with the BT module 5 within the predetermined time (YES at S13), the controller 4 determines whether or not the connection procedure has been normally terminated between the BT module 5 and the BT module 24, and determines whether or not the connection of the particular profile has been successful (or results in success) (S14).

Figure 5:
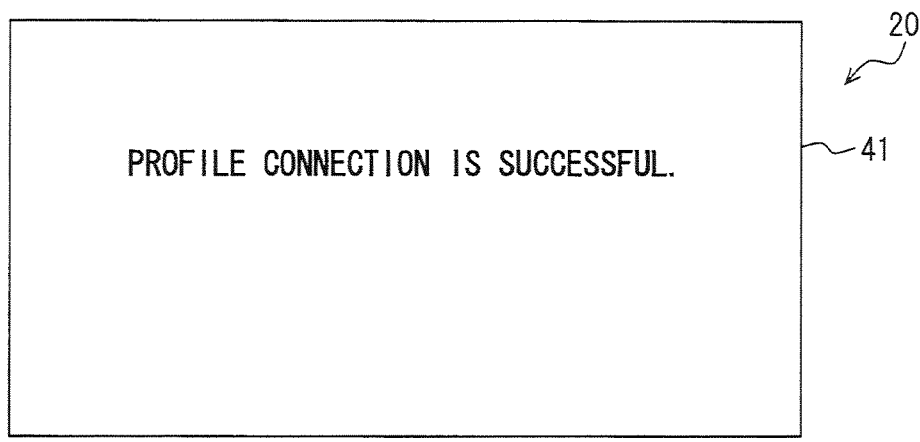
FIG. 5 is an example of a connection success notification window.

When it is determined that the connection procedure has been normally terminated between the BT module 5 and the BT module 24 and the connection of the particular profile has been successful (YES at S14), the controller 4 outputs the display command signal to the display controller 9. Then the controller 4 controls the display controller 9 to display a connection success notification window 41 to notify the user of the success of the connection of the particular profile with e.g. a message "Profile connection is successful." on the display 20 as shown in FIG. 5 (S15). Then the controller 4 determines not to change the setting of the connection mode for the particular profile (S16), terminates the process of determination of connection from communication originator apparatus, and returns to the profile connection mode setting process.

Figure 6:
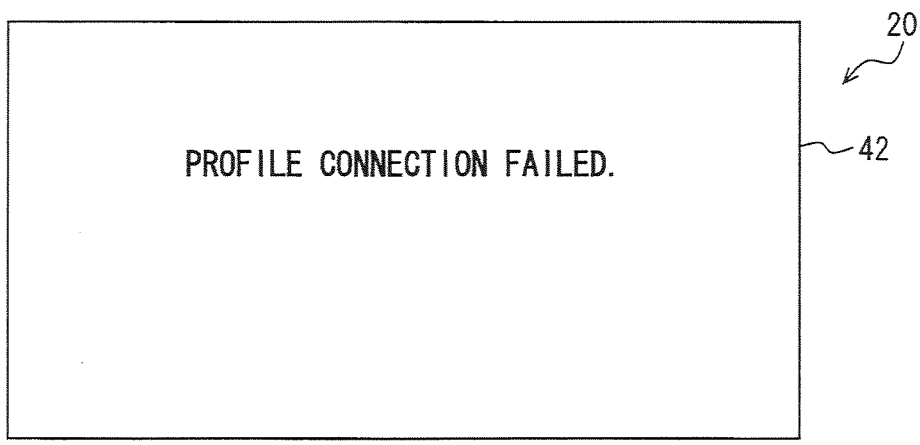
FIG. 6 is an example of a connection failure notification window.

On the other hand, when it is determined that the connection procedure has not been normally terminated between the BT module 5 and the BT module 24 and it is determined that the connection of the particular profile has not been successful (failed or results in failure) (NO at S14), the controller 4 outputs the display command signal to the display controller 9. Then the controller 4 controls the display controller 9 to display a connection failure notification window 42 to notify the user of the failure of the connection of the particular profile with e.g. a message "Profile connection failed" on the display 20 as shown in FIG. 6 (S17). Then, also in this case, the controller 4 determines not to change the setting of the connection mode for the particular profile (S16), terminates the process of determination of connection from communication originator apparatus, and returns to the profile connection mode setting process.

Figure 7:
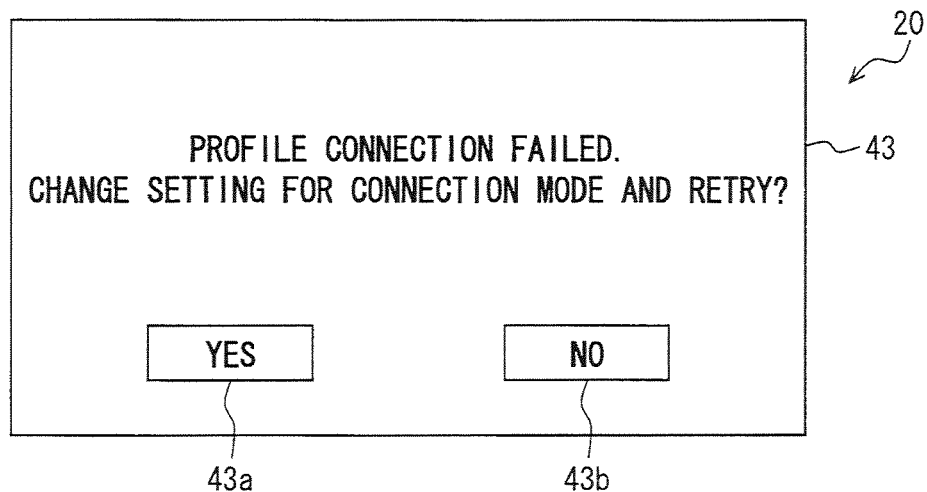
FIG. 7 is an example of a retry inquiry window.

Further, after the transmission of the profile connection request signal from the BT module 5 to the BT module 24 and the start of the time measurement of the predetermined time with the timer function, the controller 4 determines whether the profile connection response signal from the BT module 24 has not been received with the BT module 5 within the predetermined time (S13). When it is determined that the profile connection response signal from the BT module 24 has not been received with the BT module 5 within the predetermined time (NO at S13), the controller 4 outputs the display command signal to the display controller 9. Then the controller 4 controls the display controller 9 to display a retry inquiry window 43 to ask the user whether or not the setting of the connection mode is changed so as to retry connection with e.g. a message "Profile connection failed. Change setting for connection mode and retry?" on the display 20 as shown in FIG. 7 (S18).

In this case, it is possible for the user to select to change the setting of the connection mode and retry connection by operating a "YES" switch 43a formed in the retry inquiry window 43. On the other hand, it is possible for the user to select not to change the setting of the connection mode not to retry connection by operating a "NO" switch 43b.

When it is determined by receiving the operation detection signal from the operation input unit 10 that the user has operated the "NO" switch 43b in the retry inquiry window 43, i.e., the user does not intend to retry connection using the connection mode for the "connection from communication partner apparatus" (NO at S19), also in this case, the controller 4 determines not to change the setting of the connection mode for the particular profile (S16), terminates the process of determination of connection from communication originator apparatus, and returns to the profile connection mode setting process.

On the other hand, it is determined by receiving the operation detection signal from the operation input unit 10 that the user has operated the "YES" switch 43a in the retry inquiry window 43, i.e., the user intends to retry connection using the connection mode for the "connection from communication partner apparatus" (YES at S19), the controller 4 moves to a waiting status for the reception of the profile connection request signal from the BT module 24 to the BT module 5 (S20). Then the controller 4 transmits a status transition notification signal, indicating the transition to the waiting status for the reception of the profile connection request signal from the BT module 24 to the BT module 5, from the BT module 5 to the BT module 24 (S21). Then the controller 4 waits for the reception of the profile connection request signal from the BT module 24 to the BT module 5 for the predetermined time, then starts the connection procedure (S22), and starts the time measurement of the predetermined time with the timer function (S23). The predetermined time in this case is longer than time required by the BT module 24 to normally perform the series of process, after the reception of the status transition notification signal from the BT module 5, to transmit the profile connection request signal to the BT module 5, and shorter than time required by the BT module 24 to determine that the status transition notification signal has been received from the BT module 5 but it is impossible to transmit the profile connection request signal to the BT module 5 due to some factor. The predetermined time may be previously set using e.g. the result of connection test between the in-vehicle apparatus 2 and the cellular phone 3.

Further, after the transmission of the status transition notification signal from the BT module 5 to the BT module 24 and the start of time measurement of the predetermined time with the timer function, when it is determined that the profile connection request signal from the BT module 24 has been received with the BT module 5 within the predetermined time (YES at S24), the controller 4 transmits the profile connection response signal from BT module 5 to the BT module 24 (S25). Then the controller 4 determines whether or not the connection procedure has been normally terminated between the BT module 5 and the BT module 24, and determines whether or not the connection of the particular profile has been successful (results in success) (S26).

Figure 8:
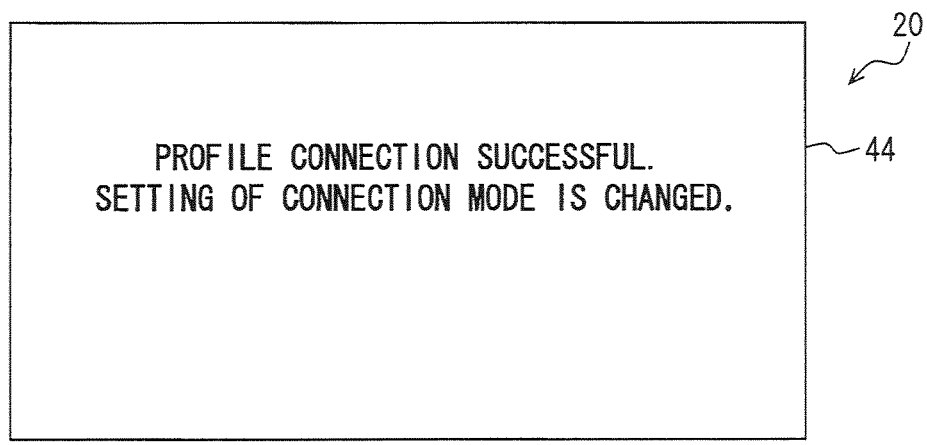
FIG. 8 is an example of a connection success and setting change notification window.

When it is determined that the connection procedure has been normally terminated between the BT module 5 and the BT module 24 and it is determined that the connection of the particular profile has been successful (YES at S26), the controller 4 outputs the display command signal to the display controller 9. Then the controller 4 controls the display controller 9 to display a connection success and setting change notification window 44 to notify the user of the success of the connection of the particular profile and to notify the user of change of the setting of the connection mode with e.g. a message "Profile connection successful. Setting of connection mode is changed." on the display 20 as shown in FIG. 8 (S27). Then, the controller 4 determines to change the setting of the connection mode for the particular profile (S28), terminates the process of determination of connection from communication originator apparatus, and returns to the profile connection mode setting process. In this case, the controller 4 changes (updates) the setting of the connection mode for the particular profile stored in the storage unit 7 from the "connection from communication originator apparatus" to the "connection from communication partner apparatus," which is stored in the storage unit 7 so as to be associated with (i) identification information (device information or the like) of the cellular phone 3 that is connected to the BT communication line and (ii) the particular profile.

Figure 9:
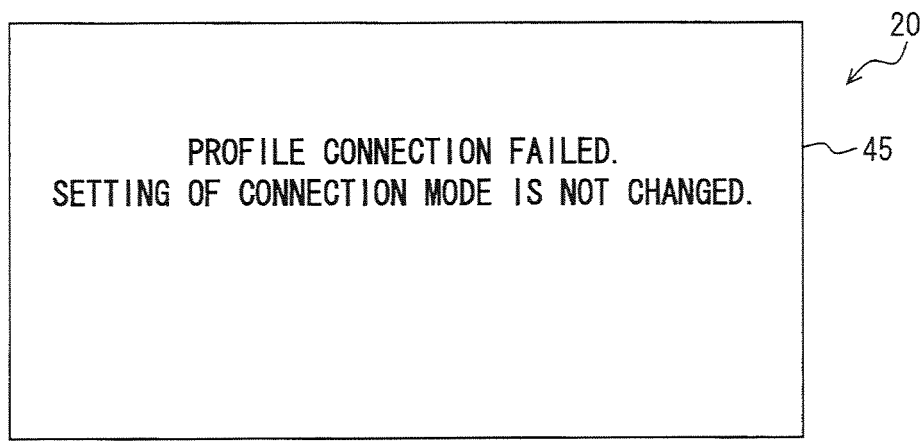
FIG. 9 is an example of a connection failure and setting continuation notification window.
Figure 10:
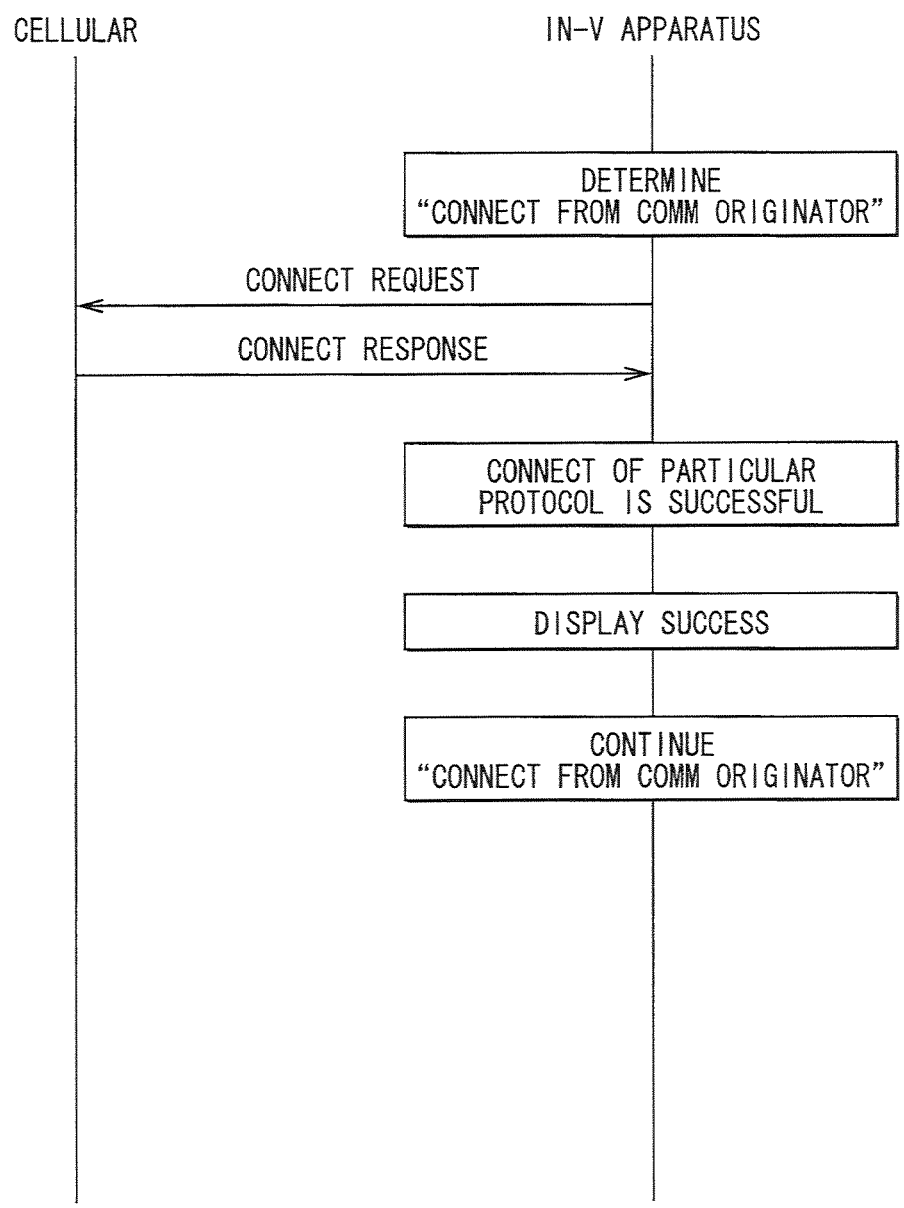
FIGS. 10, 11, 12, 13, 14, 15, 16, and 17 are sequence diagrams.
Figure 11:
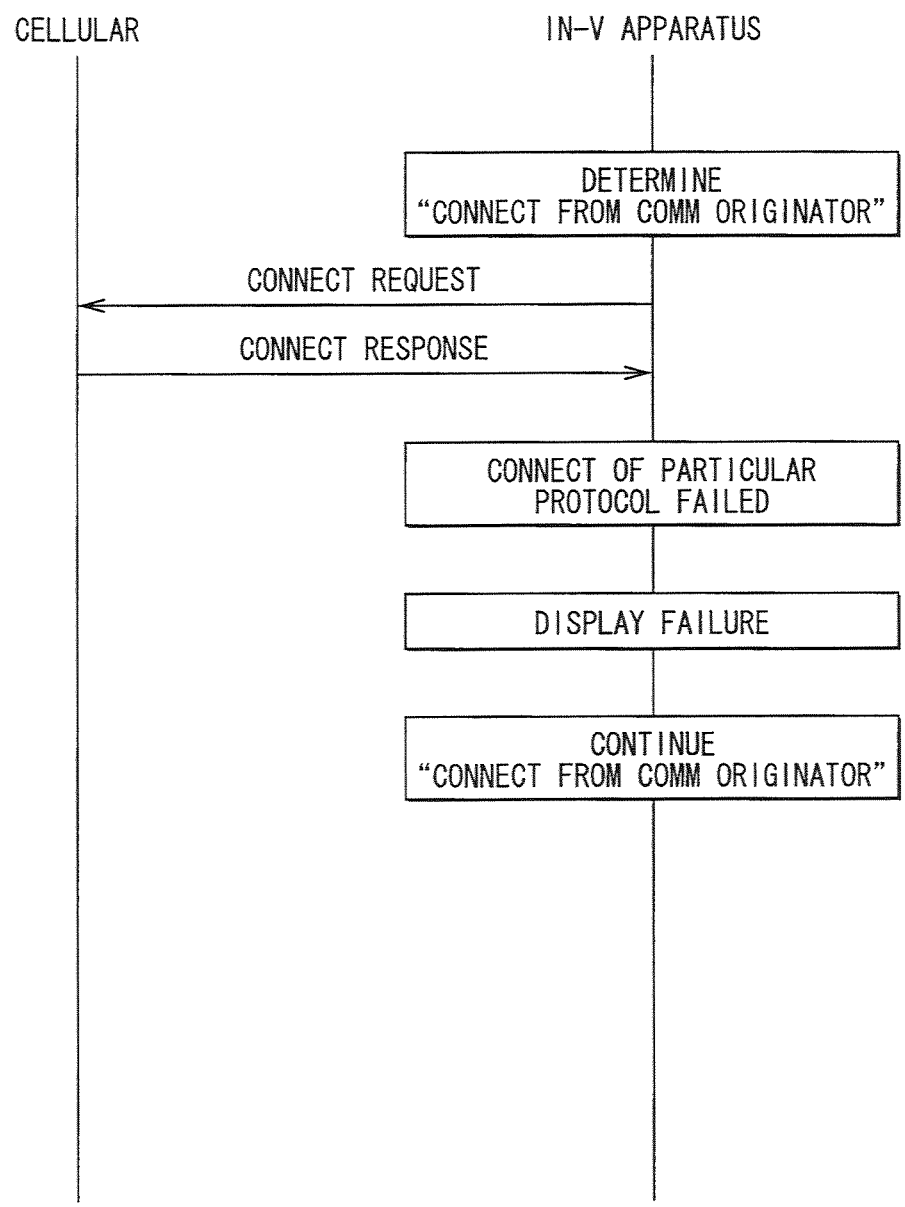
Figure 12:
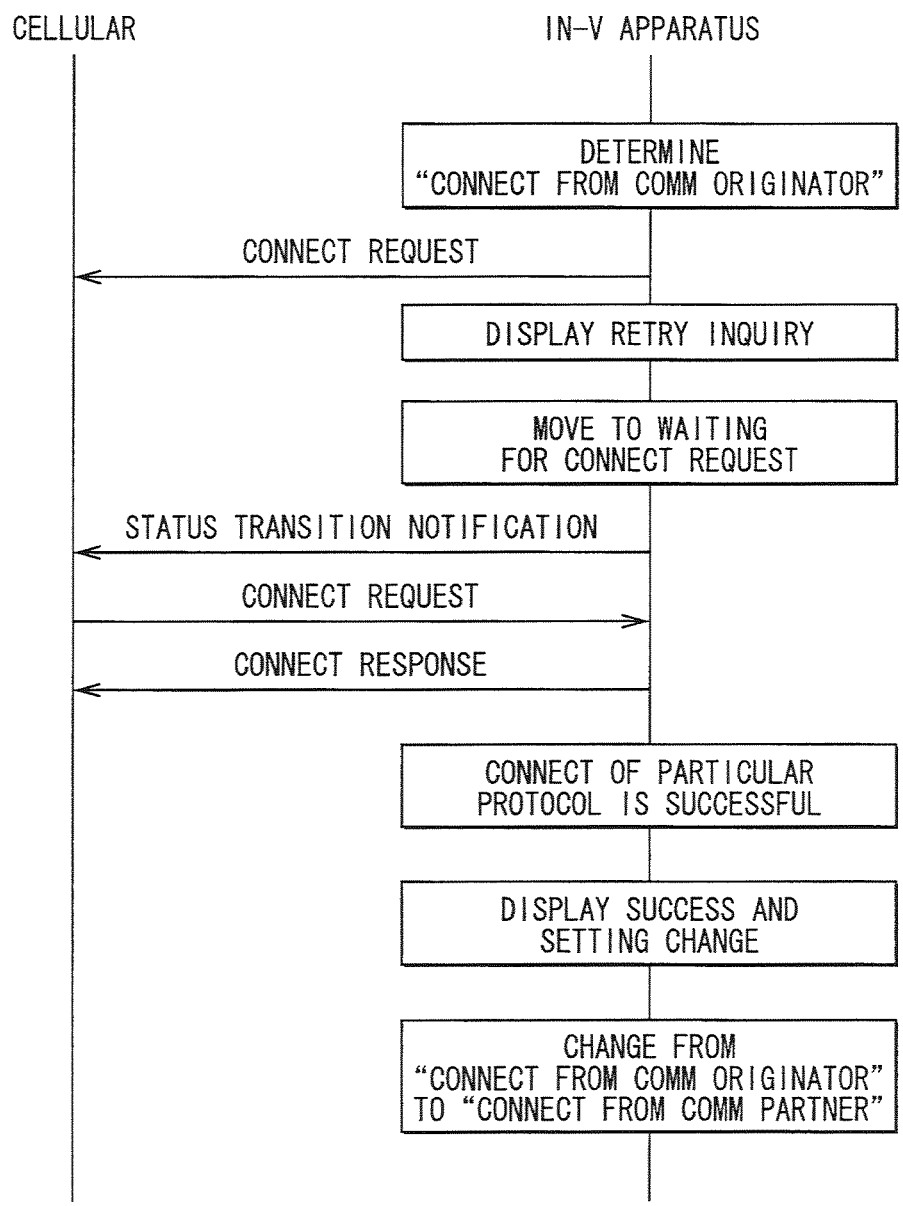
Figure 13:
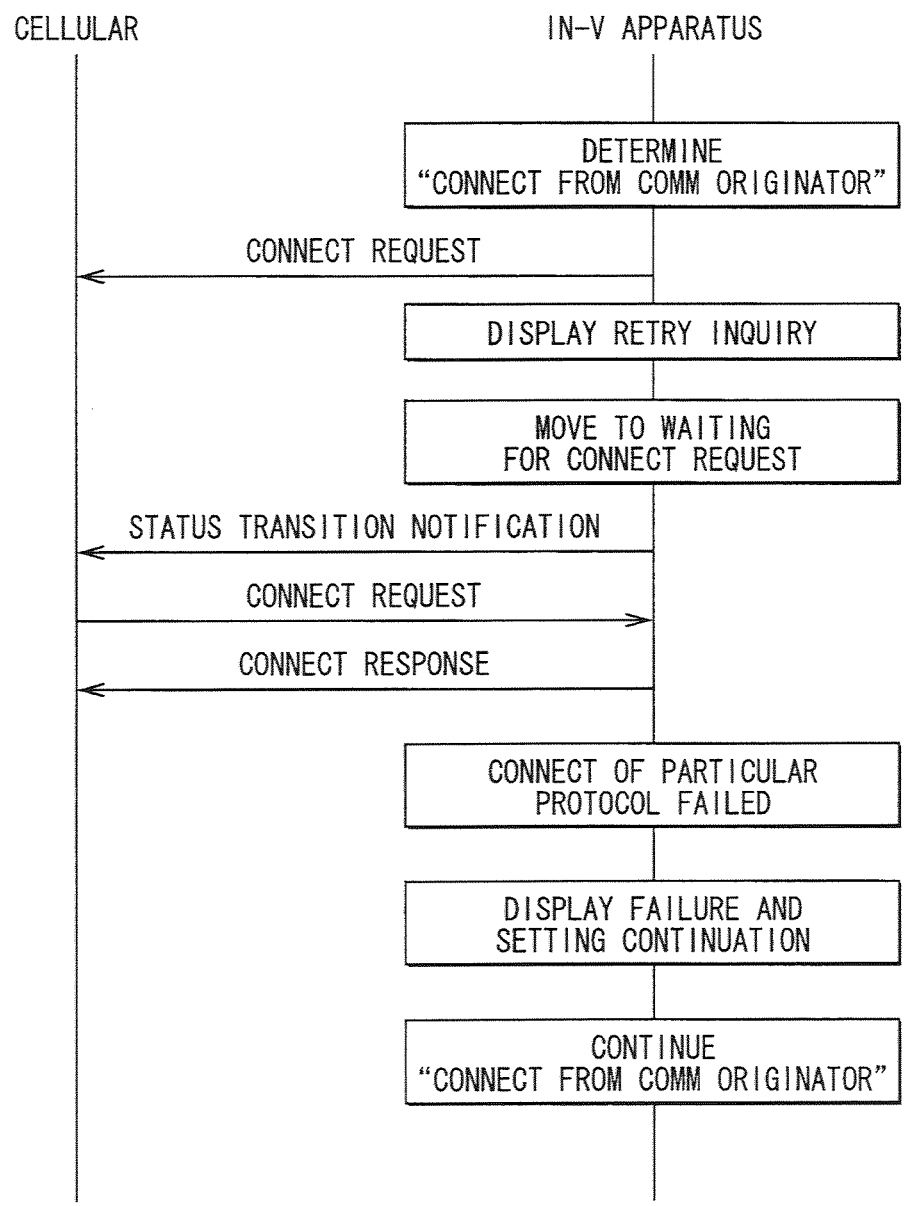
Figure 14:
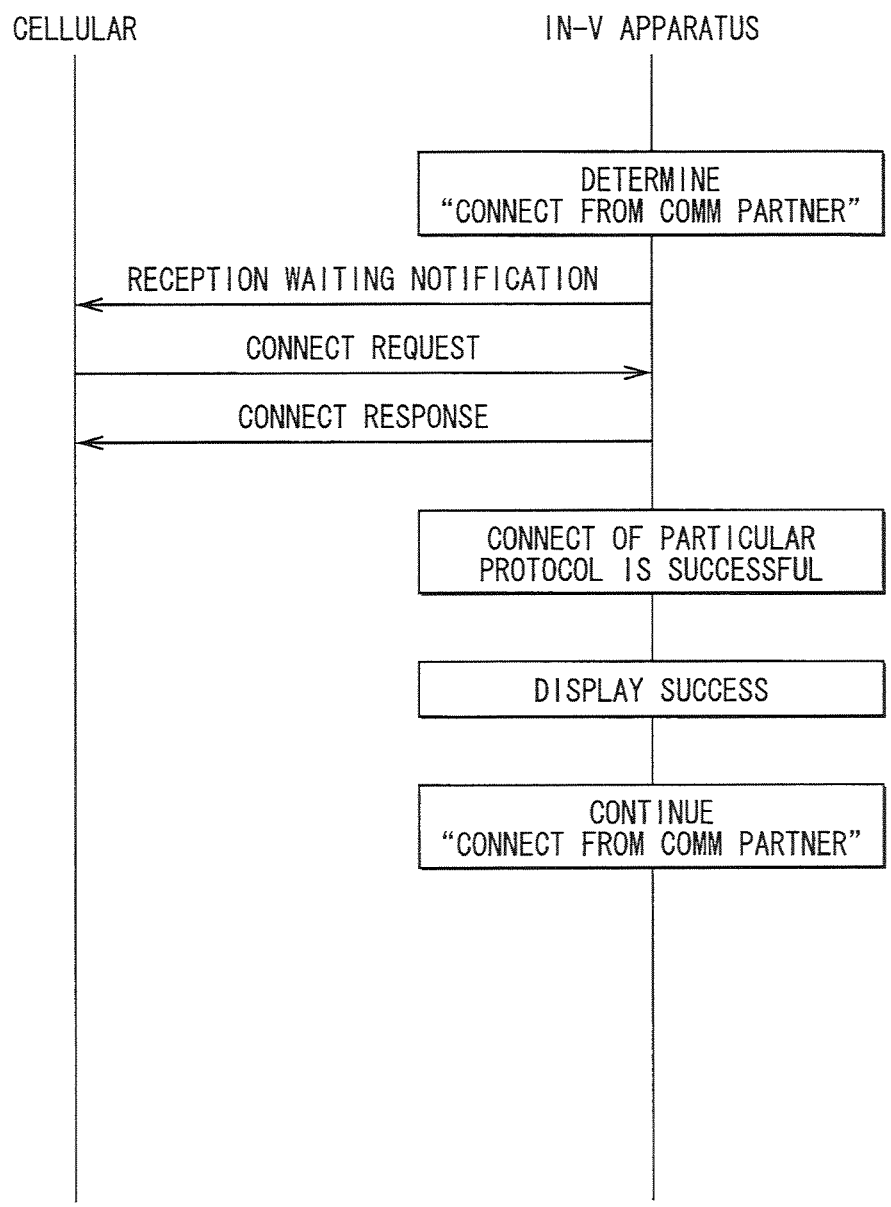
Figure 15:
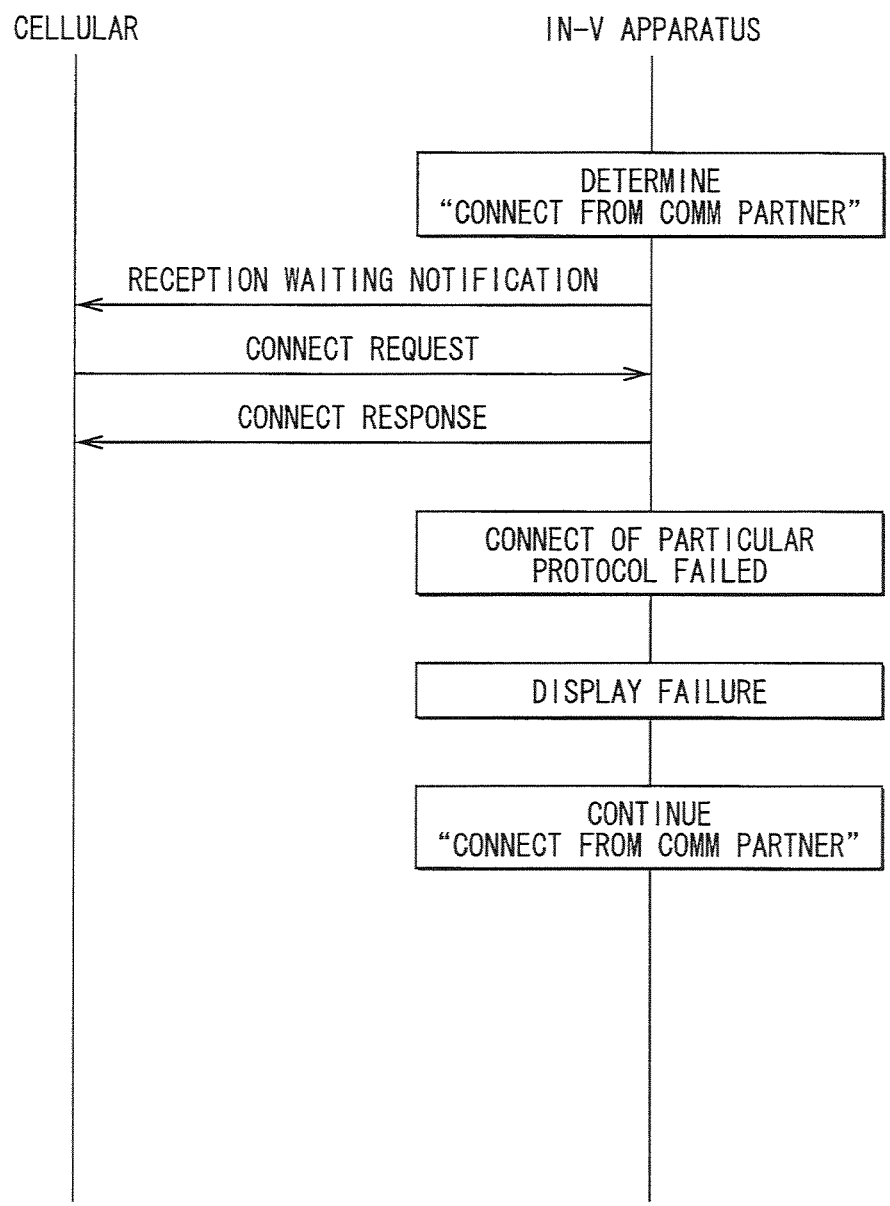
Figure 16:
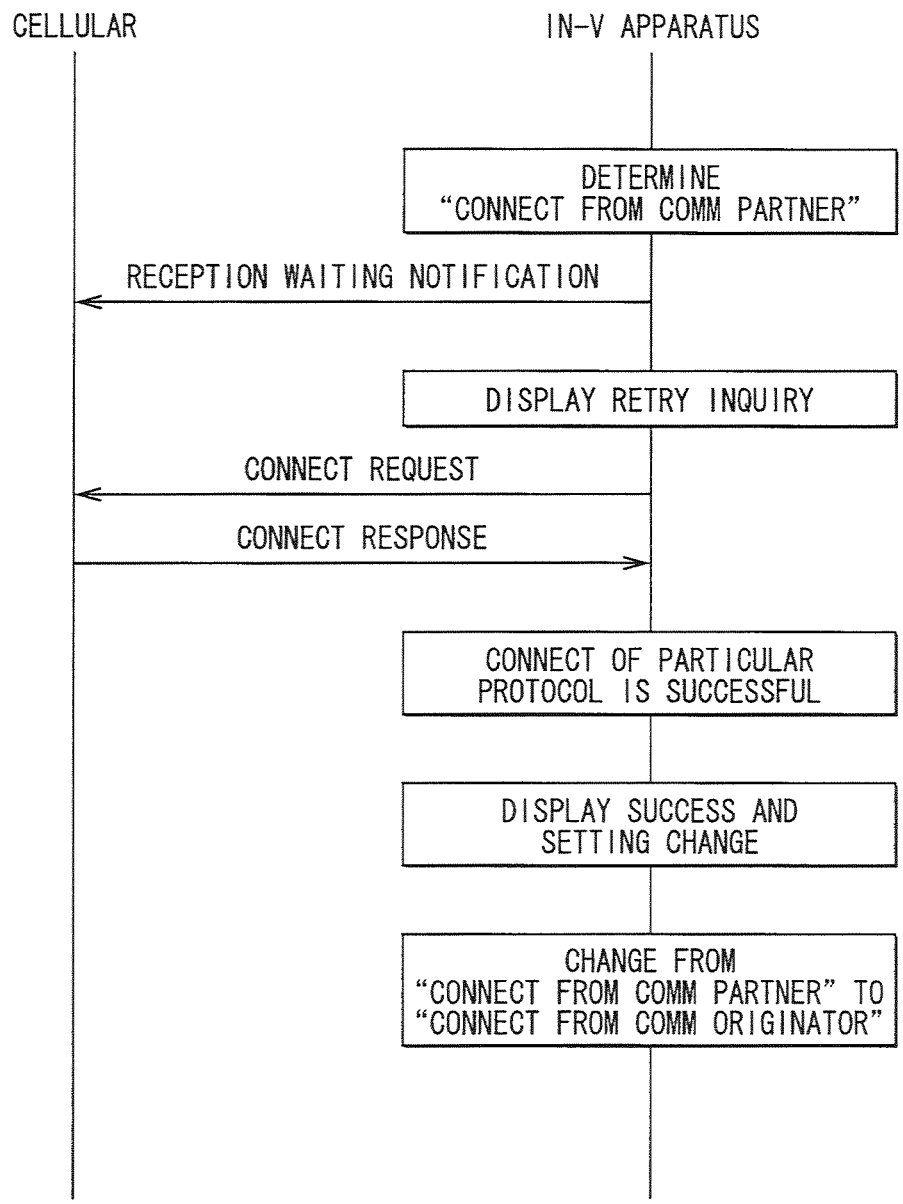
Figure 17:
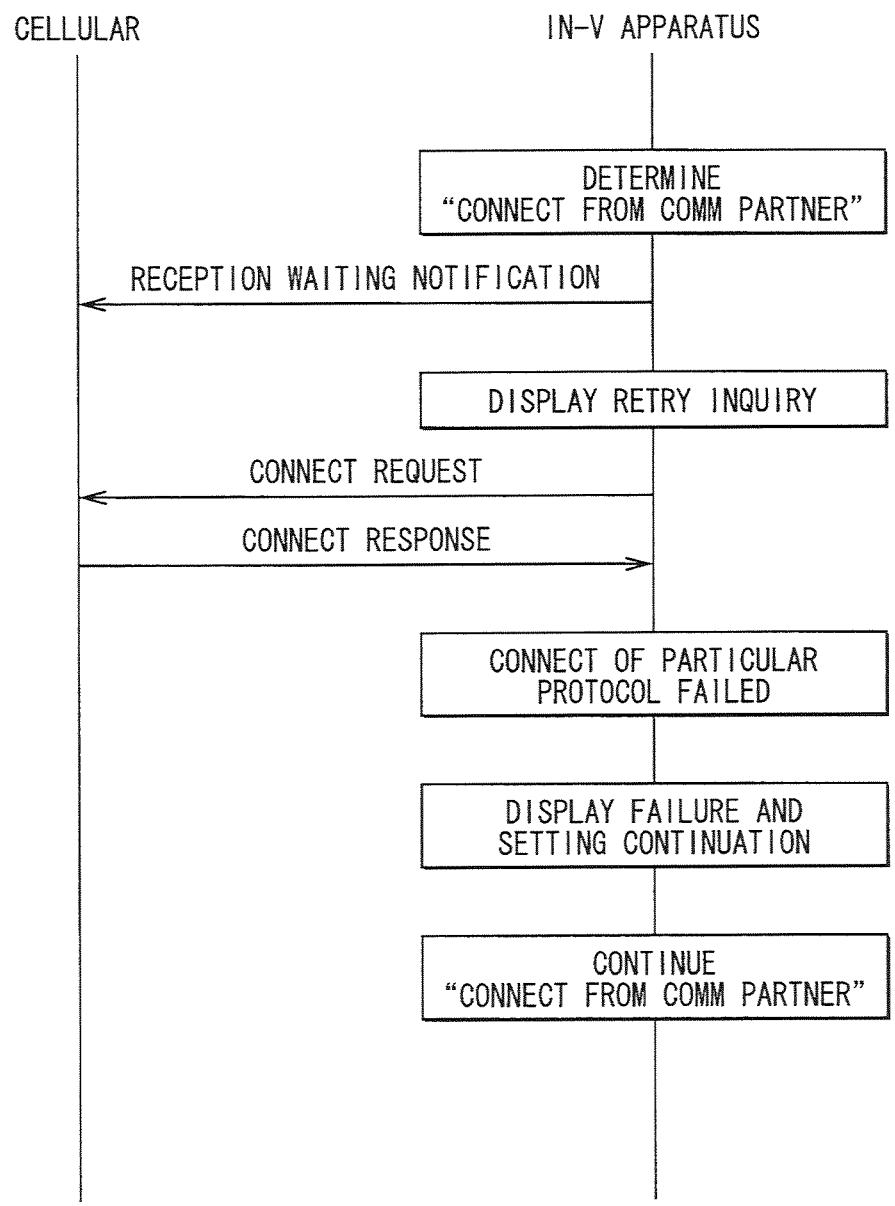

On the other hand, when it is determined that the connection procedure has not been normally terminated between the BT module 5 and the BT module 24 and it is determined that the connection of the particular profile has not been successful (NO at S26), the controller 4 outputs the display command signal to the display controller 9. Then the controller 4 controls the display controller 9 to display a connection failure and setting continuation notification window 45 to notify the user of the failure of the connection of the particular profile and to notify the user of continuation of the connection mode with e.g. a message "Profile connection failed. Setting of connection mode is not changed." on the display 20 as shown in FIG. 9 (S29). Then the controller 4 determines not to change the setting of the connection mode for the particular profile (S16), then terminates the process of determination of connection from communication originator apparatus, and returns to the profile connection mode setting process.

The processes when the initial setting of the connection mode for the particular profile is the "connection from communication originator apparatus" as described above are as follows.

(a) The controller 4 transmits the profile connection request signal to the cellular phone 3, and receives the profile connection response signal from the cellular phone 3. When it is determined that the connection of the particular profile has been successful, the controller 4 displays the connection success notification window 41, and continues the setting of the "connection from communication originator apparatus" (see FIG. 10).

(b) The controller 4 transmits the profile connection request signal to the cellular phone 3, and receives the profile connection response signal from the cellular phone 3. When it is determined that the connection of the particular profile has not been successful, the controller 4 displays the connection failure notification window 42, and continues the setting of the "connection from communication originator apparatus" (see FIG. 11).

(c) After the transmission of the profile connection request signal to the cellular phone 3, when the profile connection response signal has not been received from the cellular phone 3, the controller 4 displays the retry inquiry window 43. When it is determined that the setting of the connection mode is changed and connection is retried, the controller 4 moves to the waiting status for the reception of the profile connection request signal. Then the controller 4 transmits the status transition notification signal to the cellular phone 3. When the profile connection request signal is received from the cellular phone 3, the controller 4 transmits the profile connection response signal to the cellular phone 3. When it is determined that the connection of the particular profile has been successful, the controller 4 displays the connection success and setting change notification window 44, and changes the setting from the "connection from communication originator apparatus" to the "connection from communication partner apparatus" (see FIG. 12). In this case, when the BT communication line is connected so as to connect the particular profile between the in-vehicle apparatus 2 and the same cellular phone 3 next time, the controller 4 selects the "connection from communication partner apparatus" and starts the connection procedure.

(d) After the transmission of the profile connection request signal to the cellular phone 3, when the profile connection response signal has not been received from the cellular phone 3 within the predetermined time, the controller 4 displays the retry inquiry window 43. When it is determined that the setting of the connection mode is changed and connection is retried, the controller 4 moves to the waiting status for the reception of the profile connection request signal. Then the controller 4 transmits the status transition notification signal to the cellular phone 3. When the profile connection request signal is received from the cellular phone 3, the controller 4 transmits the profile connection response signal to the cellular phone 3. When it is determined that the connection of the particular profile has not been successful, the controller 4 displays the connection failure and setting continuation notification window 45, and continues the setting of the "connection from communication originator apparatus" (see FIG. 13).

(3) Determination of Connection from Communication Partner Apparatus (See FIG. 4)

The controller 4 moves from the profile connection mode setting process to the process of determination of connection from communication partner apparatus. Then the controller 4 starts the determination of the connection from communication partner apparatus, and transmits a reception waiting notification signal indicating the waiting for the reception of the profile connection request signal from the BT module 5 to the BT module 24 (S31). Then the controller 4 waits for the reception of the profile connection request signal from the BT module 24 to the BT module 5 for the predetermined time to start the connection procedure (S32), and starts the time measurement of the predetermined time with the timer function (S33). The predetermined time in this case is longer than time required by the BT module 24 to normally perform the series of process, after the reception of the reception waiting notification signal from the BT module 5, to transmit the profile connection request signal to the BT module 5, and shorter than time required by the BT module 24 to determine that the reception waiting notification signal has been received from the BT module 5 but it is impossible to transmit the profile connection request signal to the BT module 5 due to some factor. The predetermined time may be previously set using e.g. the result of connection test between the in-vehicle apparatus 2 and the cellular phone 3.

After the transmission of the reception waiting notification signal from the BT module 5 to the BT module 24 and the start of the time measurement of the predetermined time with the timer function, when it is determined that the profile connection request signal from the BT module 24 has been received with the BT module 5 within the predetermined time (YES at S34), the controller 4 transmits the profile connection response signal from the BT module 5 to the BT module 24 (S35). Then the controller 4 determines whether or not the connection procedure has been normally terminated between the BT module 5 and the BT module 24, and determines whether or not the connection of the particular profile has been successful (S36).

When it is determined that the connection procedure has been normally terminated between the BT module 5 and the BT module 24 and it is determined that the connection of the particular profile has been successful (i.e., results in success) (YES at S36), the controller 4 outputs the display command signal to the display controller 9. Then the controller 4 controls the display controller 9 to display the connection success notification window 41 to notify the user of the success of the connection of the particular profile with e.g. a message "Profile connection successful." on the display 20 as shown in FIG. 5 (S37). Then the controller 4 determines not to change the setting of the connection mode for the particular profile (S38), then terminates the determination of the connection from communication partner apparatus, and returns to the profile connection mode setting process.

On the other hand, when it is determined that the connection procedure has not been normally terminated between the BT module 5 and the BT module 24 and it is determined that the connection of the particular profile has not been successful (results in failure) (NO at S36), the controller 4 outputs the display command signal to the display controller 9. Then the controller 4 controls the display controller 9 to display the connection failure notification window 42 to notify the user of the failure of the connection of the particular profile with e.g. a message "Profile connection failed." on the display 20 as shown in FIG. 6 (S39). Then, also in this case, the controller 4 determines not to change the setting of the connection mode for the particular profile (S38), then terminates the determination of the connection from communication partner apparatus, and returns to the profile connection mode setting process.

Further, after the transmission of the profile connection request signal from the BT module 5 to the BT module 24 and the start of the time measurement of the predetermined time with the timer function, when it is determined that the profile connection request signal from the BT module 24 has not been received with the BT module 5 within the predetermined time (NO at S34), the controller 4 outputs the display command signal to the display controller 9. Then the controller 4 controls the display controller 9 to display the retry inquiry window 43 to ask the user whether or not the setting of the connection mode is changed so as to retry connection with e.g. a message "Profile connection failed. Change setting of connection mode and retry?" on the display 20 as shown in FIG. 7 (S40).

In this case, it is possible for the user to select to change the setting of the connection mode and retry connection by operating the "YES" switch 43a formed in the retry inquiry window 43. On the other hand, it is possible for the user to select not to change the setting of the connection mode not to retry connection by operating the "NO" switch 43b.

When it is determined by receiving the operation detection signal from the operation input unit 10 that the user has operated the "NO" switch 43b in the retry inquiry window 43, i.e., the user does not intend to retry connection using the connection mode for the "connection from communication originator apparatus" (NO at S41), also in this case, the controller 4 determines not to change the setting of the connection mode for the particular profile (S38), terminates the process of determination of connection from communication partner apparatus, and returns to the profile connection mode setting process.

On the other hand, when it is determined by receiving the operation detection signal from the operation input unit 10 that the user has operated the "YES" switch 43a in the retry inquiry window 43, i.e., the user intends to retry connection using the connection mode for the "connection from communication originator apparatus" (YES at S41), the controller 4 transmits the profile connection request signal from the BT module 5 to the BT module 24 then starts the connection procedure (S42), then starts the time measurement of the predetermined time with the timer function (S43), and waits for the reception of the profile connection response signal from the BT module 24 to the BT module 5 for the predetermined time (S44). The predetermined time in this case is longer than time required by the BT module 24 to normally perform the series of process, after the reception of the profile connection request signal from the BT module 5, to transmit the profile connection response signal to the BT module 5, and is shorter than time required by the BT module 24 to determine that the profile connection request signal has been received from the BT module 5 but it is impossible to transmit the profile connection response signal to the BT module 5 due to some factor. The predetermined time may be previously set using e.g. the result of connection test between the in-vehicle apparatus 2 and the cellular phone 3.

Further, after the transmission of the profile connection request signal from the BT module 5 to the BT module 24 and the start of the time measurement of the predetermined time with the timer function, when it is determined that the profile connection response signal from the BT module 24 has been received with the BT module 5 within the predetermined time (YES at S44), the controller 4 determines whether or not the connection procedure has been normally terminated between the BT module 5 and the BT module 24 and determines whether or not the connection of the particular profile has been successful (S45).

When it is determined that the connection procedure has been normally terminated between the BT module 5 and the BT module 24 and it is determined that the connection of the particular profile has been successful (YES at S45), the controller 4 outputs the display command signal to the display controller 9. Then the controller 4 controls the display controller 9 to display the connection success and setting change notification window 44 to notify the user of the success of the connection of the particular profile and to notify the user of change of the setting of the connection mode with e.g. a message "Profile connection successful. Setting of connection mode is changed." on the display 20 as shown in FIG. 8 (S46). Then the controller 4 determines to change the setting of the connection mode for the particular profile (S47), then terminates the determination of the connection from communication partner apparatus, and returns to the profile connection mode setting process. In this case, the controller 4 changes (updates) the setting of the connection mode for the particular profile stored in the storage unit 7 from the "connection from communication partner apparatus" to the "connection from communication originator apparatus," which is stored in the storage unit 7 so as to be associated with (i) the identification information (device information or the like) of the cellular phone 3 that is connected to the BT communication line and (ii) the particular profile.

On the other hand, when it is determined that the connection procedure has not been normally terminated between the BT module 5 and the BT module 24 and it is determined that the connection of the particular profile has not been successful (NO at S45), the controller 4 outputs the display command signal to the display controller 9. Then the controller 4 controls the display controller 9 to display the connection failure and setting continuation notification window 45 to notify the user of the failure of the connection of the particular profile and to notify the user of continuation of the connection mode with e.g. a message "Profile connection failed. Setting of connection mode is not changed." on the display 20 as shown in FIG. 9 (S48). Then the controller 4 determines not to change the setting of the connection mode for the particular profile (S38), then terminates the determination of the connection from communication partner apparatus, and returns to the profile connection mode setting process.

The processes when the initial setting of the connection mode for the particular profile is the "connection from communication partner apparatus" as described above are as follows.

(e) The controller 4 transmits the reception waiting notification signal to the cellular phone 3, then, receives the profile connection request signal from the cellular phone 3, and transmits the profile connection response signal to the cellular phone 3. When it is determined that the connection of the particular profile has been successful, the controller 4 displays the connection success notification window 41, and continues the setting of the "connection from communication partner apparatus" (see FIG. 14).

(f) The controller 4 transmits the reception waiting notification signal to the cellular phone 3, then receives the profile connection request signal from the cellular phone 3, and transmits the profile connection response signal to the cellular phone 3. When it is determined that the connection of the particular profile has not been successful, displays the connection failure notification window 42, and continues the setting of the "connection from communication partner apparatus" (see FIG. 15).

(g) After the transmission of the reception waiting notification signal to the cellular phone 3, when the profile connection request signal has not been received from the cellular phone 3, the controller 4 displays the retry inquiry window 43. When it is determined that the setting of the connection mode is changed and connection is retried, the controller 4 transmits the profile connection request signal to the cellular phone 3, and receives the profile connection response signal from the cellular phone 3. When it is determined that the connection of the particular profile has been successful, the controller 4 displays the connection success and setting change notification window 44, and changes the setting of the "connection from communication partner apparatus" to the "connection from communication originator apparatus" (see FIG. 16). In this case, when the BT communication line is connected so as to connect the particular profile between the in-vehicle apparatus 2 and the same cellular phone 3 next time, the controller 4 selects the "connection from communication originator apparatus" and starts the connection procedure.

(h) After the transmission of the reception waiting notification signal to the cellular phone 3, when the profile connection request signal has not been received from the cellular phone 3, the controller 4 displays the retry inquiry window 43. When it is determined that the setting of the connection mode is changed and connection is retried, the controller 4 transmits the profile connection request signal to the cellular phone 3, and receives the profile connection response signal from the cellular phone 3. When it is determined that the connection of the particular profile has not been successful, the controller 4 displays the connection failure and setting continuation notification window 45, and continues the setting of the "connection from communication partner apparatus" (see FIG. 17).

Next, a more particular example will be described. When the cellular phone 3 as a communication partner of the in-vehicle apparatus 2 has a music reproduction function, the particular profile is the AVRCP, the connection mode for the AVRCP in the BT module 5 of the in-vehicle apparatus 2 is the "connection from communication originator apparatus" and the connection mode for the AVRCP in the BT module of 24 of the cellular phone 3 is the "connection from communication originator apparatus," i.e., both of the BT module 5 and the BT module 24 transmit an AVRCP connection request signal, it is impossible to connect the AVRCP between the BT module 5 and the BT module 24.

However, in the present embodiment, the controller 4 changes the setting of the connection mode for the AVRCP in the BT module 5 from the "connection from communication originator apparatus" to the "connection from communication partner apparatus." With this arrangement, it is possible for the BT module 5 to receive the AVRCP connection request signal from the BT module 24 and transmit an AVRCP connection response signal to the BT module 24. When the connection procedure for the AVRCP has been normally terminated between the BT module 5 and the BT module 24, it is possible to connect the AVRCP between the BT module 5 and the BT module 24. Note that similar process may be performed when the communication partner of the in-vehicle apparatus 2 is a music player having a music reproduction function. Further, similar process may be performed when the particular profile is other than the AVRCP (the SPP, the DUN or the like).

For example, when the particular profile is the SPP, the connection mode for the SPP in the BT module 5 of the in-vehicle apparatus 2 is the "connection from communication partner apparatus," and the connection mode for the SPP in the BT module 24 of the cellular phone 3 is the "connection from communication partner apparatus," i.e., both of the BT module 5 and the BT module 24 receive an SPP connection request signal for a predetermined time, it is impossible to connect the SPP between the BT module 5 and the BT module 24. As the controller 4 changes the connection mode for the SPP in the BT module 5 from the "connection from communication partner apparatus" to the "connection from communication originator apparatus," it is possible for the BT module 5 to transmit the SPP connection request signal to the BT module 24 and receive an SPP connection response signal from the BT module 24. When the connection procedure for the SPP has been normally terminated between the BT module 5 and the BT module 24, it is possible to connect the SPP between the BT module 5 and the BT module 24.

As described above, according to the present embodiment, in the in-vehicle apparatus 2, as a profile connection mode, the connection mode of transmitting the profile connection request signal to the cellular phone 3 as a communication partner to start the connection procedure, or the connection mode of waiting for the reception of the profile connection request signal from the cellular phone 3 as a communication partner for a predetermined time and starting the connection procedure, is alternatively selected and performed. When the connection procedure by the selected connection mode is started and the connection of the profile fails, the connection procedure by the unselected connection mode is started. When the connection procedure by the unselected connection mode is started and the connection of the profile is successful, the connection mode in the successful profile connection is selected upon occurrence of the next profile connection request. With this arrangement, regardless of the connection mode adopted in the cellular phone 3 as a communication partner, it is possible to appropriately connect the profile. Further, upon occurrence of the next profile connection request, instead of starting the connection procedure by the failed connection mode, the connection procedure by the connection mode in the successful connection is started. Thus it is possible to quickly complete the profile connection.

The present disclosure is not limited to the above-described embodiment, however, modifications and expansions as follows can be made.

The short range wireless communication apparatus is not limited to the in-vehicle apparatus 2. A navigation apparatus having a known navigation function or the like may be used as long as the apparatus has a BT module having an equivalent function to that of the BT module 5, and further, an apparatus not integrated in a vehicle may be used. Further, the communication partner apparatus as a data communication partner of the short range wireless communication apparatus is not limited to the cellular phone 3. A mobile information terminal or the like may be used as long as it has a structure with a BT module having an equivalent function to that of the BT module 24, and further, a fixed terminal which cannot be brought by the user may be used.

The method for inquiry about the user's determination to change the setting of the connection mode and retry connection is not limited to the visual method of displaying the retry inquiry window 43. An auditory method of outputting audio guidance indicating the inquiry may be used, and further, the combination of the visual and auditory methods may be used.

Further, the inquiry about the user's determination to change the setting of the connection mode and retry connection may be omitted. That is, it may be arranged as follows. In the process of determination of connection from communication originator apparatus, the profile connection request signal is transmitted from the BT module 5 to the BT module 24 and the time measurement of the predetermined time is started with the timer function. Then, when it is determined that the profile connection response signal from the BT module 24 has not been received with the BT module 5 within the predetermined time, the process moves to the waiting status for the reception of the profile connection request signal from the BT module 24 to the BT module 5. Then the status transition notification signal is transmitted from the BT module 5 to the BT module 24, then the reception of the profile connection request signal from the BT module 24 to the BT module 5 is waited for the predetermined time, and the connection procedure is started.

Further, it may be arranged as follows. In the process of determination of connection from communication partner apparatus, the profile connection request signal is transmitted from the BT module 5 to the BT module 24, then the time measurement of the predetermined time with the timer function is started. When it is determined that the profile connection request signal from the BT module 24 has not been received with the BT module 5 within the predetermined time, the profile connection request signal is transmitted from the BT module 5 to the BT module 24, and the connection procedure is started.

When plural profiles are simultaneously connected between the BT module 5 and the BT module 24, it may be arranged such that while other profile than the particular profile is connected between the BT module 5 and the BT module 24, the profile connection mode setting process for the particular profile is performed. Further, in a structure where plural BT communication lines are simultaneously connected in one-many relation between the BT module 5 and plural BT modules (including the BT module 24) (so-called multi-point connection), while other profile than the particular profile is connected between the BT module 5 and one BT module, the profile connection mode setting process for the particular profile may be performed between the BT module 5 and another BT module. Further, when it is impossible to simultaneously connect plural profiles between the BT module 5 and the BT module 24, it may be arranged such that after the execution of the profile connection mode setting process for the particular profile and the success of the connection of the particular profile, the particular profile in the successful connection is temporarily disconnected, and the profile connection mode setting process for the next particular profile is performed.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A short range wireless communication apparatus comprising:
   a connection device to connect a predetermined communication protocol between the connection device and a communication-partner side connection device in short range wireless communication; and
   a controller to alternatively select a first connection mode or a second connection mode to connect the predetermined communication protocol, to start a connection procedure,
   the first connection mode transmitting a predetermined communication protocol connection request signal from the connection device to the communication-partner side connection device,
   the second connection mode waiting for reception of a predetermined communication protocol connection request signal from the communication-partner side connection device to the connection device for a predetermined time,
   wherein:
   the controller selects one of the first connection mode and the second connection mode when connecting the predetermined communication protocol between the connection device and the communication-partner side connection device and then determines whether the connection of the predetermined communication protocol using the one of the first connection mode and the second connection mode results in failure or success;
   when it is determined that the connection of the predetermined communication protocol using the one of the first connection mode and the second connection mode results in failure, the controller starts the connection procedure using an other of the first connection mode and the second connection mode that is different from the one of the first connection mode and the second connection mode and then determines whether the connection of the predetermined communication protocol using the other of the first connection mode and the second connection mode results in failure or success; and
   when it is determined that the connection of the predetermined communication protocol using the other of the first connection mode and the second connection mode results in success, the controller selects the other of the first connection mode and the second connection mode upon next connection of the predetermined communication protocol between the connection device and the communication-partner side connection device.

2. The short range wireless communication apparatus according to claim 1, wherein:
   the connection device connects the predetermined communication protocol between the connection device and a plurality of communication-partner side connection devices in the short range wireless communication; and
   upon connection of the predetermined communication protocol between the connection device and one of the plurality of communication-partner side connection devices,
   the controller
      identifies the one of the plurality of communication-partner side connection devices as a connection target of the predetermined communication protocol, and
      selects one of the first connection mode and the second connection mode, the one being associated with the one of the plurality of communication-partner side connection devices that is identified as the connection target by the controller.

3. The short range wireless communication apparatus according to claim 1, wherein:
   in cases that (i) an inquiry is made to a user as to whether or not the connection procedure using the other of the first connection mode and the second connection mode is started and (ii) it is determined that the user intends to start the connection procedure using the other of the first connection mode and the second connection mode, the controller starts the connection procedure using the other of the first connection mode and the second connection mode.

4. The short range wireless communication apparatus according to claim 1,
wherein the controller selects the first connection mode as the one of the first connection mode and the second connection mode, and selects the second connection mode as the other of the first connection mode and the second connection mode.

5. The short range wireless communication apparatus according to claim 1,
wherein the controller selects the second connection mode as the one of the first connection mode and the second connection mode, and selects the first connection mode as the other of the first connection mode and the second connection mode.

6. The short range wireless communication apparatus according claim 1, wherein:
the controller determines that the connection of the predetermined communication protocol using the one of the first connection mode and the second connection mode results in failure, in cases that the controller does not receive a connection response signal of the predetermined communication protocol or a connection request signal of the predetermined communication protocol, from the communication-partner side connection device; and
the controller determines that the connection of the predetermined communication protocol using the one of the first connection mode and the second connection mode results in success, in cases that (i) the controller receives a connection response signal of the predetermined communication protocol or a connection request signal of the predetermined communication protocol, from the communication-partner side connection device, and (ii) the controller determines that the connection procedure using the one of the first connection mode and the second connection mode is normally terminated between the connection device and the communication-partner side connection device.

7. The short range wireless communication apparatus according to claim 1, wherein:
the controller does not start the connection procedure using the other of the first connection mode and the second connection mode, in cases that (i) the controller receives a connection response signal of the predetermined communication protocol or a connection request signal of the predetermined communication protocol, from the communication-partner side connection device, but (ii) the controller determines that the connection procedure using the one of the first connection mode and the second connection mode is not normally terminated between the connection device and the communication-partner side connection device.

8. The short range wireless communication apparatus according to claim 1, further comprising:
a nonvolatile storage device to store as a first stored connection mode one of the first connection mode and the second connection mode to connect the predetermined communication protocol,
wherein:
the controller selects the one of the first connection mode and the second connection mode that is stored as the first stored connection mode in the storage device when connecting the predetermined communication protocol between the connection device and the communication-partner side connection device and then determines whether the connection of the predetermined communication protocol using the one of the first connection mode and the second connection mode results in failure or success;
when it is determined that the connection of the predetermined communication protocol using the one of the first connection mode and the second connection mode results in failure, the controller starts the connection procedure using an other of the first connection mode and the second connection mode that is different from the one of the first connection mode and the second connection mode and then determines whether the connection of the predetermined communication protocol using the other of the first connection mode and the second connection mode results in failure or success; and
when it is determined that the connection of the predetermined communication protocol using the other of the first connection mode and the second connection mode results in success, the controller stores as a second stored connection mode the other of the first connection mode and the second connection mode in the storage device, so as to select the other of the first connection mode and the second connection mode that is stored as the second stored connection mode in the storage device upon next connection of the predetermined communication protocol between the connection device and the communication-partner side connection device.

9. A short range wireless communication apparatus comprising:
a connection device to connect a predetermined communication protocol between the connection device and a communication-partner side connection device in short range wireless communication;
a controller to alternatively select a first connection mode or a second connection mode to connect the predetermined communication protocol, to start a connection procedure,
the first connection mode transmitting a predetermined communication protocol connection request signal from the connection device to the communication-partner side connection device,
the second connection mode waiting for reception of the predetermined communication protocol connection request signal from the communication-partner side connection device to the connection device for a predetermined time; and
a nonvolatile storage device to store as a first stored connection mode one of the first connection mode and the second connection mode to connect the predetermined communication protocol,
wherein:
the controller selects the one of the first connection mode and the second connection mode that is stored as the first stored connection mode in the storage device when connecting the predetermined communication protocol between the connection device and the communication-partner side connection device and then determines whether the connection of the predetermined communication protocol using the one of the first connection mode and the second connection mode results in failure or success;
when it is determined that the connection of the predetermined communication protocol using the one of the first connection mode and the second connection mode results in failure, the controller starts the connection procedure using an other of the first connection mode and the second connection mode that is different from the one of the first connection mode and the second connection mode and then determines whether the connection of the predetermined communication protocol using the other of the first connection mode and the second connection mode results in failure or success; and when it is determined that the connection of the predetermined communication protocol using the other of the first connection mode and the second connection mode results in success, the controller stores as a second stored connection mode the other of the first connection mode and the second connection mode in the storage device, so as to select the other of the first connection mode and the second connection mode that is stored as the second stored connection mode in the storage device upon next connection of the predetermined communication protocol between the connection device and the communication-partner side connection device.

10. The short range wireless communication apparatus according to claim 9, wherein:

the connection device connects the predetermined communication protocol between the connection device and a plurality of communication-partner side connection devices in the short range wireless communication;

the storage device stores a plurality of first stored connection modes associated with the plurality of communication-partner side connection devices, respectively, the plurality of first stored connection modes being selected by the controller upon connection of the predetermined communication protocol between the connection device and the plurality of communication-partner side connection devices, respectively; and upon connection of the predetermined communication protocol between the connection device and one of the plurality of communication-partner side connection devices, the controller identifies the one of the plurality of communication-partner side connection devices as a connection target of the predetermined communication protocol, and selects the first stored connection mode, which is stored in the storage device and associated with the one of the plurality of communication-partner side connection devices that is identified as the connection target by the controller.

11. The short range wireless communication apparatus according to claim 9, wherein:

in cases that (i) an inquiry is made to a user as to whether or not the connection procedure using the other of the first connection mode and the second connection mode is started and (ii) it is determined that the user intends to start the connection procedure using the other of the first connection mode and the second connection mode, the controller starts the connection procedure using the other of the first connection mode and the second connection mode.

12. The short range wireless communication apparatus according to claim 9, wherein the controller selects the first connection mode as the one of the first connection mode and the second connection mode, and selects the second connection mode as the other of the first connection mode and the second connection mode.

13. The short range wireless communication apparatus according to claim 9, wherein the controller selects the second connection mode as the one of the first connection mode and the second connection mode, and selects the first connection mode as the other of the first connection mode and the second connection mode.

14. The short range wireless communication apparatus according to claim 9, wherein:

the controller determines that the connection of the predetermined communication protocol using the one of the first connection mode and the second connection mode results in failure, in cases that the controller does not receive a connection response signal of the predetermined communication protocol or a connection request signal of the predetermined communication protocol, from the communication-partner side connection device; and the controller determines that the connection of the predetermined communication protocol using the one of the first connection mode and the second connection mode results in success, in cases that (i) the controller receives a connection response signal of the predetermined communication protocol or a connection request signal of the predetermined communication protocol, from the communication-partner side connection device, and (ii) the controller determines that the connection procedure using the one of the first connection mode and the second connection mode is normally terminated between the connection device and the communication-partner side connection device.

15. The short range wireless communication apparatus according to claim 9, wherein:

the controller does not start the connection procedure using the other of the first connection mode and the second connection mode, in cases that (i) the controller receives a connection response signal of the predetermined communication protocol or a connection request signal of the predetermined communication protocol, from the communication-partner side connection device, but (ii) the controller determines that the connection procedure using the one of the first connection mode and the second connection mode is not normally terminated between the connection device and the communication-partner side connection device.

\* \* \* \* \*